US008014618B2

(12) United States Patent
Kyung et al.

(10) Patent No.: US 8,014,618 B2
(45) Date of Patent: Sep. 6, 2011

(54) HIGH-SPEED MOTION COMPENSATION APPARATUS AND METHOD

(75) Inventors: Chong-Min Kyung, Daejeon (KR); Jaemoon Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 936 days.

(21) Appl. No.: 11/954,485

(22) Filed: Dec. 12, 2007

(65) Prior Publication Data

US 2009/0074312 A1    Mar. 19, 2009

(30) Foreign Application Priority Data

Sep. 18, 2007  (KR) .................. 10-2007-0094803

(51) Int. Cl.
*G06K 9/46* (2006.01)
(52) U.S. Cl. .............. 382/236; 375/240.17; 386/331; 348/451; 348/431.1
(58) Field of Classification Search ............. 382/236; 375/240.16, 240.17; 386/331; 348/451, 348/431.1
See application file for complete search history.

(56) References Cited

U.S. PATENT DOCUMENTS

| 4,862,267 | A  | * | 8/1989  | Gillard et al.   | 348/443    |
|-----------|----|---|---------|------------------|------------|
| 6,430,316 | B1 | * | 8/2002  | Wilkinson        | 382/236    |
| 6,950,469 | B2 | * | 9/2005  | Karczewicz et al.| 375/240.17 |
| 7,116,831 | B2 | * | 10/2006 | Mukerjee et al.  | 382/236    |
| 7,620,109 | B2 | * | 11/2009 | Srinivasan       | 375/240.29 |
| 7,924,921 | B2 | * | 4/2011  | Crinon et al.    | 375/240.16 |
| 2003/0202607 | A1 | * | 10/2003 | Srinivasan    | 375/240.29 |
| 2008/0310509 | A1 | * | 12/2008 | Goel          | 375/240.16 |

OTHER PUBLICATIONS

Mo Li, et al. The High Throughput and Low Memory Access Design of Sub-pixel Interpolation for H.264/AVC HDTV Decoder, Signal Processing Systems Design and Implementation, 2005, pp. 296-301.
Tsai, et al. Bandwidth Optimized Motion Compensation Hardware Design for H.264/AVC HDTV Decoder, Circuits and Systems, 2005, pp. 1199-1202.
Wang, et al. A New Motion Compensation Design for H.264/AVC Decoder, Circuits and Systems, 2005, pp. 4558-4561.

* cited by examiner

*Primary Examiner* — Jason M Repko
*Assistant Examiner* — Patrick Edwards
(74) *Attorney, Agent, or Firm* — Lucas & Mercanti, LLP

(57) ABSTRACT

The present invention relates to a high-speed motion compensation apparatus and method. The high-speed motion compensation apparatus for H.264/AVC includes a bus interface unit for reading a plurality of word addresses from an external storage device, aligning the reference pixels arranged over the plurality of word addresses, temporarily storing the aligned reference pixels, and sequentially outputting the aligned and temporarily stored reference pixels. A buffer unit temporarily stores overlapping reference pixels, which are repeatedly used to generate the sub-pixels, among the reference pixels output from the bus interface unit. An interpolation unit generates first half pixels, second half pixels, first quarter pixels, and second quarter pixels, using the reference pixels output from the bus interface unit. A chroma filter unit generates chrome pixels using the reference pixels output from the bus interface unit.

Therefore, the high-speed motion compensation apparatus is advantageous in that the number of accesses to memory can be reduced, and reference pixels are prevented from being repeatedly read, thus enabling motion compensation to be performed at high speed.

34 Claims, 30 Drawing Sheets

FIG. 13

| VIDEO SEQUENCE | MEMORY ACCESS /MB | REDUCTION (%) | INTERPOLATION TIME/MB(CYCLE) |
|---|---|---|---|
| AKIYO | 110.5 | 79.4 | 104.0 |
| FOOTBALL | 146.8 | 72.6 | 129.6 |
| FROEMAN | 187.0 | 65.1 | 164.4 |
| STEFAN | 180.7 | 66.3 | 150.4 |
| MOTHER | 130.2 | 75.7 | 121.7 |
| COASTGUARD | 173.1 | 67.7 | 146.7 |

HIGH-SPEED MOTION COMPENSATION APPARATUS AND METHOD

BACKGROUND OF THE INVENTION

1. Field of the Invention

The present invention relates, in general, to an image compression method, and, more particularly, to a high-speed motion compensation apparatus and method in an image compression method.

2. Description of the Related Art

H.264/Advanced Video Coding (AVC) image compression is the most recently standardized image compression method, and utilizes various techniques to improve the compressibility of images. Among the techniques, a motion compensation technique is one of the principal techniques of H.264/AVC image compression, and is configured such that the region most similar to a certain region in a current frame is found in a previous frame, and only the difference between the regions and the relative location of the found region are transmitted, and thus the current frame is recovered. Therefore, when the motion compensation technique is used, information much smaller in the case where all pixel information of the current frame is transmitted can be transmitted, and thus the current frame can be recovered.

Generally, in order to generate sub-pixels, a number of reference pixels greater than the number of sub-pixels is required. However, since, typically, a large number of reference pixels overlaps each other, a method of retrieving overlapping reference pixels from reference frames every time, as in the case of conventional motion compensation, is inefficient because it takes a lot of time and power consumption is high. Further, since reference pixels, required to generate sub-pixels, are not efficiently distributed in word addresses, it is inefficient to retrieve words without aligning reference pixels, as in the case of conventional motion compensation.

FIGS. 1A and 1B are diagrams showing reference pixels based on the partitioning of sub-macroblocks.

FIG. 1A illustrates four sub-macroblocks 10a, each composed of 4×4 sub-pixels, and a reference frame 20a required to generate the sub-macroblocks 10a, and FIG. 1B illustrates two sub-macroblocks 10b, each composed of 4×4 sub-pixels and a reference frame 20b required to generate the sub-macroblocks 10b. In this case, shaded regions 30a and 30b indicate reference pixels that overlap each other in the reference frames 20a and 20b, required to generate the sub-macroblocks 10a and 10b, each composed of 4×4 sub-pixels, and white regions 40a and 40b indicate reference pixels that do not overlap each other. Therefore, it is inefficient with respect to both time and power to retrieve the shaded regions 30a and 30b, that is, reference pixels overlapping each other in motion compensation, from the reference frames 20a and 20b at each time.

FIGS. 2A and 2B are diagrams showing reference pixels distributed in word addresses.

Referring to FIGS. 2A and 2B, each of small rectangles 60a and 60b indicates a single pixel, and four small rectangles 50a or 50b indicate a single word address. Shaded regions 70a and 70b indicate reference pixels, which are required for motion compensation, and white regions 80a and 80b indicate reference pixels, which are not required for motion compensation.

Typically, a single pixel is represented by 8 bits, and respective pixels are stored in memory. Therefore, when a 32-bit word address is used, four pixels are stored in a single word address. In this case, when only one of the required reference pixels is included in a single word address at the time of motion compensation, the remaining three unnecessary reference pixels must be read together with the necessary reference pixel in order to read the one reference pixel. For example, in FIG. 2A, since reference pixels 70a required for motion compensation are efficiently distributed in word addresses, all reference pixels 70a required for motion compensation can be read if only four words 65a are retrieved. In contrast, in FIG. 2B, since required reference pixels 70b are distributed over eight word addresses, all reference pixels 70b required for motion compensation can be read only when eight words 65b are retrieved. However, in general, since reference pixels required for motion compensation are not necessarily efficiently distributed in word addresses, as shown in FIG. 2A, it takes a lot of time and power to perform motion compensation.

Accordingly, there is a need to improve the performance of motion compensation by efficiently managing overlapping reference pixels and efficiently aligning reference pixels distributed in word addresses.

SUMMARY OF THE INVENTION

Accordingly, the present invention has been made keeping in mind the above problems occurring in the prior art, and an object of the present invention is to provide a high-speed motion compensation apparatus, which can reduce the number of accesses to memory by efficiently managing overlapping reference pixels and efficiently aligning reference pixels distributed in word addresses, thus improving the performance of motion compensation.

Another object of the present invention is to provide a high-speed motion compensation method, which can reduce the number of accesses to memory by efficiently managing overlapping reference pixels and efficiently aligning reference pixels distributed in word addresses, thus improving the performance of motion compensation.

In accordance with an aspect of the present invention to accomplish the above objects, there is provided a high-speed motion compensation apparatus for generating sub-pixels using reference pixels for motion compensation, comprising a bus interface unit for reading a plurality of word addresses from an external storage device, aligning the reference pixels arranged over the plurality of word addresses, temporarily storing the aligned reference pixels, and sequentially outputting the aligned and temporarily stored reference pixels, a buffer unit for temporarily storing overlapping reference pixels, which are repeatedly used to generate the sub-pixels, among the reference pixels output from the bus interface unit, an interpolation unit for generating first half pixels, second half pixels, first quarter pixels, and second quarter pixels, using the reference pixels output from the bus interface unit, and a chroma filter unit for generating chroma pixels using the reference pixels output from the bus interface unit.

Preferably, the bus interface unit may comprise a first buffer for storing first reference pixels used for current motion compensation.

Preferably, the bus interface unit may comprise a second buffer for storing second reference pixels to be used for subsequent motion compensation.

Preferably, the buffer unit may comprise a third buffer for storing overlapping reference pixels, among the reference pixels required to generate vertically or diagonally arranged sub-pixels.

Preferably, the buffer unit may comprise a fourth buffer for storing overlapping reference pixels, among the reference pixels required to generate horizontally or diagonally arranged sub-pixels.

Preferably, the interpolation unit may comprise a first interpolator for performing interpolation between integer pixels, which are the reference pixels, thus generating first half pixels, a second interpolator for performing interpolation between the first half pixels, thus generating second half pixels, a third interpolator for performing interpolation between the first half pixels and the integer pixels, thus generating first quarter pixels, and a fourth interpolator for performing interpolation between the first half pixels and the second half pixels, or between the first half pixels, thus generating second quarter pixels.

Preferably, the first interpolator may comprise four first FIR filters, and may generate 8-bit first half pixels using the following Equation [1b], which is a modification of the following Equation [1a], $$1hp = \min(255, \max(0, (p0 - 5p1 + 20p2 + 20p3 - 5p4 + p5 + 16) \gg 5)) \quad [1a]$$

$$1hp = \min(255, \max(0, ((p0 + p5) + (4(p2 + p3) - (p1 + p4)) + 4(4(p2 + p3) - (p1 + p4)) + 16) \gg 5 \quad [1b]$$

where p0, p1, p2, p3, p4, and p5 denote 8-bit integer pixels, and 1hp denotes an 8-bit first half pixel.

Preferably, each of the first FIR filters may comprise a first adder for performing an addition operation on the integer pixels p0 and p5, a second adder for performing an addition operation on the integer pixels p2 and p3, a third adder for performing an addition operation on the integer pixels p1 and p4, a first shifter for performing an operation of shifting an operation result of the second adder 2 bits to left, a first subtractor for performing a subtraction operation on an operation result of the first shifter and an operation result of the third adder, a fourth adder for performing an addition operation on an operation result of the first adder and an operation result of the first subtractor, a second shifter for performing an operation of shifting an operation result of the first subtractor 2 bits to left, a third shifter for performing an operation of shifting an operation result of the first subtracter 2 bits to left, a fifth adder for performing an addition operation on an operation result of the third shifter and a rounding coefficient of 16, a sixth adder for performing an addition operation on an operation result of the second shifter and an operation result of the fourth adder, and outputting an operation result thereof to a half buffer, a seventh adder for performing an addition operation on an operation result of the fourth adder and an operation result of the fifth adder, and a first clip unit for outputting an operation result of the seventh adder without change when the operation result falls within a range from 0 to 255, outputting 0 when the operation result is less than 0, and outputting 255 when the operation result is greater than 255.

Preferably, the second interpolator may comprise four second FIR filters, and may generate 8-bit second half pixels using the following Equation [2b], which is a modification of the following Equation [2a], $$2hp = \min(255, \max(0, (1HP0 - 5HP1 + 20HP2 + 20HP3 - 5HP4 + HP5 + 512) \gg 10)) \quad [2a]$$

$$2hp = \min(255, \max(0, ((HP0 + HP5) + (4(HP2 + HP3) - (HP1 + HP4)) + 4(4(HP2 + HP3) - (HP1 + HP4)) + 512) \gg 10)) \quad [2b]$$

where HP0, HP1, HP2, HP3, HP4, and HP5 denote 15-bit first half pixels stored in the half buffer, and 2hp denotes an 8-bit second half pixel.

Preferably, each of the second FIR filters may comprise an eighth adder for performing an addition operation on the first half pixels HP0 and HP5, a ninth adder for performing an addition operation on the first half pixels HP2 and HP3, a tenth adder for performing an addition operation on the first half pixels HP1 and HP4, a fourth shifter for performing an operation of shifting an operation result of the ninth adder 2 bits to left, a second subtractor for performing a subtraction operation on an operation result of the fourth shifter and an operation result of the tenth adder, an eleventh adder for performing an addition operation on an operation result of the eighth adder and an operation result of the second subtractor, a fifth shifter for performing an operation of shifting an operation result of the second subtractor 2 bits to left, a twelfth adder for performing an addition operation on an operation result of the fifth shifter and a rounding coefficient of 512, a thirteenth adder for performing an addition operation on an operation result of the eleventh adder and an operation result of the twelfth adder, a sixth shifter for performing an operation of shifting an operation result of the thirteenth adder 10 bits to right, and a second clip unit for outputting an operation result of the sixth shifter without change when the operation result of the sixth shifter falls within a range from 0 to 255, outputting 0 when the operation result is less than 0, and outputting 255 when the operation result is greater than 255.

Preferably, the third interpolator may comprise four first mean filters, and may generate 8-bit first quarter pixels using respective mean values of the 8-bit first half pixels, output from the first clip unit, and the integer pixels.

Preferably, each of the first mean filters may comprise a fourteenth adder for performing an addition operation on a first half pixel and a corresponding integer pixel, a fifteenth adder for performing an addition operation on an operation result of the fourteenth adder and a rounding coefficient of 1, and a seventh shifter for performing an operation of shifting an operation result of the fifteenth adder 1 bit to right.

Preferably, the fourth interpolator may comprise four second mean filters, and may generate 8-bit second quarter pixels using respective mean values of the 8-bit first half pixels output from the first clip unit and the 8-bit second half pixels output from the second clip unit, or respective mean values of the 8-bit first half pixels, output from the first clip unit.

Preferably, each of the second mean filters may comprise a sixteenth adder for performing an addition operation on a first half pixel and a corresponding second half pixel, or on first half pixels, a seventeenth adder for performing an addition operation on an operation result of the sixteenth adder and a rounding coefficient of 1, and a seventh shifter for performing an operation of shifting an operation result of the seventeenth adder 1 bit to right.

Preferably, the chroma filter unit may comprise four bilinear filters, and may generate 8-bit chroma pixels using the following Equation [3b], which is a modification of the following Equation [3a], $$cp = ((8 - dy) \times (8 - dx) \times A + dx \times (8 - dy) \times B + (8 - dx) \times dy \times C + dx \times dy \times D + 32) \gg 5 \quad [3a]$$

$$cp = ((8 - dx) \times (8 \times A + dy \times (C - A) + dx \times (8 \times B + dy \times (D - B)) + 32) \gg 5 \quad [3b]$$

where A and B denote 8-bit integer pixels, input to the chrome filter unit, C and D denote 8-bit integer pixels, input to the chroma filter unit in a cycle subsequent to a cycle in which A and B are input to the chroma filter unit, dx and dy denote lower 3 bits of respective motion vectors, and cp denotes an 8-bit chrome pixel.

Preferably, each of the bilinear filters may comprise a first sub-unit having logic elements for implementing a term (8×A+dy×(C−A)) in Equation [3b], a second sub-unit having logic elements for implementing a term (8×A+dy×(C−A))×(8−dx), obtained by multiplying the term (8×A+dy×(C−A)) in Equation [3b] by a term (8−dx) in Equation [3b], a third sub-unit having logic elements for implementing a term (8×B+dy×(D−B)) in Equation [3b], a fourth sub-unit having logic elements for implementing a term (8×B+dy×(D−B))×dx+32, obtained by multiplying the term (8×B+dy×(D−B)) in Equation [3b] by dx in Equation [3b] and by adding a resulting value thereof to a rounding coefficient of 32, an eighteenth adder for performing an addition operation on an operation result of the second sub-unit and an operation result of the fourth sub-unit, and an eighth shifter for performing an operation of shifting an operation result of the eighteenth adder 6 bits to right.

Preferably, the first sub-unit may comprise a third subtracter for performing a subtraction operation on the integer pixels C and A, a first AND gate for performing an AND operation on an operation result of the third subtractor and the motion vector dy, a second AND gate for performing an AND operation on the operation result of the third subtractor and the motion vector dy, a third AND gate for performing an AND operation on the operation result of the third subtractor and the motion vector dy, a ninth shifter for performing an operation of shifting an operation result of the first AND gate 2 bits to left, a tenth shifter for performing an operation of shifting an operation result of the second AND gate 1 bit to left, an eleventh shifter for performing an operation of shifting the integer pixel A by 3 bits to left, a nineteenth adder for performing an addition operation on an operation result of the eleventh shifter and an operation result of the ninth shifter, a twentieth adder for performing an addition operation on an operation result of the tenth shifter and an operation result of the third AND gate, and a twenty first adder for performing an addition operation on an operation result of the nineteenth adder and an operation result of the twentieth adder.

Preferably, the second sub-unit may comprise a fourth subtractor for performing a subtraction operation on a rounding coefficient of 8 and the motion vector dx, a fourth AND gate for performing an AND operation on an operation result of the fourth subtractor and an operation result of the twenty first adder, a fifth AND gate for performing an AND operation on the operation result of the fourth subtractor and the operation result of the twenty first adder, a sixth AND gate for performing an AND operation on the operation result of the fourth subtractor and the operation result of the twenty first adder, a seventh AND gate for performing an AND operation on the operation result of the fourth subtractor and the operation result of the twenty first adder, a twelfth shifter for performing an operation of shifting an operation result of the fourth AND gate 1 bit to left, a thirteenth shifter for performing an operation of shifting an operation result of the sixth AND gate 1 bit to left, a twenty second adder for performing an addition operation on an operation result of the twelfth shifter and an operation result of the fifth AND gate, a twenty third adder for performing an addition operation on an operation result of the thirteenth shifter and an operation result of the seventh AND gate, and a twenty fourth adder for performing an addition operation on an operation result of the twenty second adder and an operation result of the twenty third adder.

Preferably, the third sub-unit may comprise a fifth subtractor for performing a subtraction operation on the integer pixels D and B, an eighth AND gate for performing an AND operation on an operation result of the fifth subtractor and the motion vector dy, a ninth AND gate for performing an AND operation on the operation result of the fifth subtractor and the motion vector dy, a tenth AND gate for performing an AND operation on the operation result of the fifth subtracter and the motion vector dy, a fourteenth shifter for performing an operation of shifting an operation result of the eighth AND gate 1 bit to left, a fifteenth shifter for performing an operation of shifting an operation result of the ninth AND gate 1 bit to left, a sixteenth shifter for performing an operation of shifting the integer pixel B 3 bits to left, a twenty fifth adder for performing an addition operation on an operation result of the sixteenth shifter and an addition result of the fourteenth shifter, a twenty sixth adder for performing an addition operation on an operation result of the fifteenth shifter and an operation result of the tenth AND gate, and a twenty seventh adder for performing an addition operation on an operation result of the twenty fifth adder and an operation result of the twenty sixth adder.

Preferably, the fourth sub-unit may comprise an eleventh AND gate for performing an AND operation on an operation result of the twenty seventh adder and the motion vector dx, a twelfth AND gate for performing an AND operation on the operation result of the twenty seventh adder and the motion vector dx, a thirteenth AND gate for performing an AND operation on the operation result of the twenty seventh adder and the motion vector dx, a seventeenth shifter for performing an operation of shifting an operation result of the eleventh AND gate 2 bits to left, an eighteenth shifter for performing an operation of shifting an operation result of the twelfth AND gate 1 bit to left, a twenty eighth adder for performing an addition operation on a rounding coefficient of 32 and an operation result of the seventeenth shifter, a twenty ninth adder for performing an addition operation on an operation result of the eighteenth shifter and an operation result of the thirteenth AND gate, and a thirtieth adder for performing an addition operation on an operation result of the twenty eighth adder and an operation result of the twenty ninth adder.

In accordance with another aspect of the present invention to accomplish the above objects, there is provided a high-speed motion compensation method of generating sub-pixels using reference pixels for motion compensation, comprising the steps of reading a plurality of word addresses from an external storage device, aligning the reference pixels arranged over the plurality of word addresses, and temporarily storing the aligned reference pixels, sequentially outputting the aligned and temporarily stored reference pixels, temporarily storing overlapping reference pixels, repeatedly used to generate the sub-pixels, among the sequentially output reference pixels, performing interpolation between integer pixels, which are the sequentially output reference pixels, thus generating first half pixels, performing interpolation between the first half pixels, thus generating second half pixels, performing interpolation between the first half pixels and the integer pixels, thus generating first quarter pixels, performing interpolation between the first half pixels and the second half pixels, or between the first half pixels, thus generating second quarter pixels, and generating chrome pixels using the sequentially output reference pixels.

Preferably, the step of aligning and temporarily storing the reference pixels may comprise a first buffering step of storing first reference pixels, used for current motion compensation, and a second buffering step of storing second reference pixels to be used for subsequent motion compensation.

Preferably, the step of temporarily storing the overlapping reference pixels may comprise a third buffering step of storing overlapping reference pixels, among the reference pixels used to generate vertically or diagonally arranged sub-pixels, and a fourth buffering step of storing overlapping reference pixels, among the reference pixels used to generate horizontally or diagonally arranged sub-pixels.

Preferably, the step of generating the first half pixels may comprise four first FIR filtering steps, and may generate 8-bit first half pixels using the following Equation [1b], which is a modification of the following Equation [1a], $$1hp = \min(255, \max(0, (p0 - 5p1 + 20p2 + 20p3 - 5p4 + p5 + 16) >> 5)) \quad [1a]$$

$$1hp = \min(255, \max(0, ((p0 + p5) + (4(p2 + p3) - (p1 + p4)) + 4(4(p2 + p3) - (p1 + p4)) + 16) >> 5 \quad [1b]$$

where p0, p1, p2, p3, p4, and p5 denote 8-bit integer pixels, and 1hp denotes an 8-bit first half pixel.

Preferably, each of the first FIR filtering steps may comprise a first addition step of performing an addition operation on the integer pixels p0 and p5, a second addition step of performing an addition operation on the integer pixels p2 and p3, a third addition step of performing an addition operation on the integer pixels p1 and p4, a first shifting step of performing an operation of shifting an operation result of the second addition step 2 bits to left, a first subtraction step of performing a subtraction operation on an operation result of the first shifting step and an operation result of the third addition step, a fourth addition step of performing an addition operation on an operation result of the first addition step and an operation result of the first subtraction step, a second shifting step of performing an operation of shifting an operation result of the first subtraction step 2 bits to left, a third shifting step of performing an operation of shifting an operation result of the first subtraction step 2 bits to left, a fifth addition step of performing an addition operation on an operation result of the third shifting step and a rounding coefficient of 16, a sixth addition step of performing an addition operation on an operation result of the second shifting step and an operation result of the fourth addition step, a seventh addition step of performing an addition operation on an operation result of the fourth addition step and an operation result of the fifth addition step, and a first clipping step of outputting an operation result of the seventh addition step without change when the operation result falls within a range from 0 to 255, outputting 0 when the operation result is less than 0, and outputting 255 when the operation result is greater than 255.

Preferably, the step of generating the second half pixels may comprise four second FIR filtering steps, and may generate 8-bit second half pixels using the following Equation [2b] which is a modification of the following Equation [2a], $$2hp = \min(255, \max(0, (1HP0 - 5HP1 + 20HP2 + 20HP3 - 5HP4 + HP5 + 512) >> 10)) \quad [2a]$$

$$2hp = \min(255, \max(0, ((HP0 + HP5) + (4(HP2 + HP3) - (HP1 + HP4)) + 4(4(HP2 + HP3) - (HP1 + HP4)) + 512) >> 10)) \quad [2b]$$

where HP0, HP1, HP2, HP3, HP4, and HP5 denote 15-bit first half pixels stored in a half buffer, and 2hp denotes an 8-bit second half pixel.

Preferably, each of the second FIR filtering steps may comprise an eighth addition step of performing an addition operation on the first half pixels HP0 and HP5, a ninth addition step of performing an addition operation on the first half pixels HP2 and HP3, a tenth addition step of performing an addition operation on the first half pixels HP1 and HP4, a fourth shifting step of performing an operation of shifting an operation result of the ninth addition step 2 bits to left, a second subtraction step of performing a subtraction operation on an operation result of the fourth shifting step and an operation result of the tenth addition step, an eleventh addition step of performing an addition operation on an operation result of the eighth addition step and an operation result of the second subtraction step, a fifth shifting step of performing an operation of shifting an operation result of the second subtraction step 2 bits to left, a twelfth addition step of performing an addition operation on an operation result of the fifth shifting step and a rounding coefficient of 512, a thirteenth addition step of performing an addition operation on an operation result of the eleventh addition step and an operation result of the twelfth addition step, a sixth shifting step of performing an operation of shifting an operation result of the thirteenth addition step 10 bits to right, and a second clipping step of outputting an operation result of the sixth shifting step without change when the operation result falls within a range from 0 to 255, outputting 0 when the operation result is less than 0, and outputting 255 when the operation result is greater than 255.

Preferably, the step of generating the first quarter pixels may comprise four first mean filtering steps, and may generate 8-bit first quarter pixels using respective mean values of the 8-bit first half pixels, output from the first clipping step, and the integer pixels.

Preferably, each of the first mean filtering steps may comprise a fourteenth addition step of performing an addition operation on a first half pixel and a corresponding integer pixel, a fifteenth addition step of performing an addition operation on an operation result of the fourteenth addition step and a rounding coefficient of 1, and a seventh shifting step of performing an operation of shifting an operation result of the fifteenth addition step 1 bit to right.

Preferably, the step of generating the second quarter pixels may comprise four second mean filtering steps, and may generate 8-bit second quarter pixels using respective mean values of the 8-bit first half pixels, output at the first clipping step, and the 8-bit second half pixels, output at the second clipping step, or respective mean values of the 8-bit first half pixels, output at the first clipping step.

Preferably, each of the second mean filtering steps may comprise a sixteenth addition step of performing an addition operation on a first half pixel and a corresponding second half pixel, or on first half pixels, a seventeenth addition step of performing an addition operation on an operation result of the sixteenth addition step and a rounding coefficient of 1, and a seventh shifting step of performing an operation of shifting an operation result of the seventeenth addition step 1 bit to right.

Preferably, the step of generating the chrome pixels may comprise four bilinear filtering steps, and may generate 8-bit chroma pixels using the following Equation [3b], which is a modification of the following Equation [3a], $$cp = ((8 - dy) \times (8 - dx) \times A + \qquad [3a]$$
$$dx \times (8 - dy) \times B + (8 - dx) \times dy \times C + dx \times D + 32) >> 5$$

$$cp = ((8 - dx) \times \qquad [3b]$$
$$(8 \times A + dy \times (C - A) + dx \times (8 \times B + dy \times (D - B)) + 32) >> 5$$

where A and B denote 8-bit integer pixels, input at the chroma pixel generation step, C and D denote 8-bit integer pixels, input at the chroma pixel generation step in a cycle subsequent to a cycle in which A and B are input at the chroma pixel generation step, dx and dy denote lower 3 bits of respective motion vectors, and cp denotes an 8-bit chroma pixel.

Preferably, each of the bilinear filtering steps may comprise a first sub-step of implementing a term (8×A+dy×(C−A)) in Equation [3b], a second sub-step of implementing a term (8×A+dy×(C−A))×(8−dx), obtained by multiplying the term (8×A+dy×(C−A)) in Equation [3b] by a term (8−dx) in Equation [3b], a third sub-step of implementing a term (8×B+dy×(D−B)) in Equation [3b], a fourth sub-step of implementing a term (8×B+dy×(D−B))×dx+32, obtained by multiplying the term (8×B+dy×(D−B)) in Equation [3b] by dx in Equation [3b] and by adding a resulting value thereof to a rounding coefficient of 32, an eighteenth addition step of performing an addition operation on an operation result of the second sub-step and an operation result of the fourth sub-step, and an eighth shifting step of performing an operation of shifting an operation result of the eighteenth addition step 6 bits to right.

Preferably, the first sub-step may comprise a third subtraction step of performing a subtraction operation on the integer pixels C and A, a first AND operation step of performing an AND operation on an operation result of the third subtraction step and the motion vector dy, a second AND operation step of performing an AND operation on the operation result of the third subtraction step and the motion vector dy, a third AND operation step of performing an AND operation on the operation result of the third subtraction step and the motion vector dy, a ninth shifting step of performing an operation of shifting an operation result of the first AND operation step 2 bits to left, a tenth shifting step of performing an operation of shifting an operation result of the second AND operation step 1 bit to left, an eleventh shifting step of performing an operation of shifting the integer pixel A 3 bits to left, a nineteenth addition step of performing an addition operation on an operation result of the eleventh shifting step and an operation result of the ninth shifting step, a twentieth addition step of performing an addition operation on an operation result of the tenth shifting step and an operation result of the third AND operation step, and a twenty first addition step of performing an addition operation on an operation result of the nineteenth addition step and an operation result of the twentieth addition step.

Preferably, the second sub-step may comprise a fourth subtraction step of performing a subtraction operation on a rounding coefficient of 8 and the motion vector dx, a fourth AND operation step of performing an AND operation on an operation result of the fourth subtraction step and an operation result of the twenty first addition step, a fifth AND operation step of performing an AND operation on the operation result of the fourth subtraction step and the operation result of the twenty first addition step, a sixth AND operation step of performing an AND operation on the operation result of the fourth subtraction step and the operation result of the twenty first addition step, a seventh AND operation step of performing an AND operation on the operation result of the fourth subtraction step and the operation result of the twenty first addition step, a twelfth shifting step of performing an operation of shifting an operation result of the fourth AND operation step 1 bit to left, a thirteenth shifting step of performing an operation of shifting an operation result of the sixth AND operation step 1 bit to left, a twenty second addition step for performing an addition operation on an operation result of the twelfth shifting step and an operation result of the fifth AND operation step, a twenty third addition step of performing an addition operation on an operation result of the thirteenth shifting step and an operation result of the seventh AND operation step, and a twenty fourth addition step of performing an addition operation on an operation result of the twenty second addition step and an operation result of the twenty third addition step.

Preferably, the third sub-step may comprise a fifth subtraction step of performing a subtraction operation on the integer pixels D and B, an eighth AND operation step of performing an AND operation on an operation result of the fifth subtraction step and the motion vector dy, a ninth AND operation step of performing an AND operation on the operation result of the fifth subtraction step and the motion vector dy, a tenth AND operation step of performing an AND operation on the operation result of the fifth subtraction step and the motion vector dy, a fourteenth shifting step of performing an operation of shifting an operation result of the eighth AND operation step 1 bit to left, a fifteenth shifting step of performing an operation of shifting an operation result of the ninth AND operation step 1 bit to left, a sixteenth shifting step of performing an operation of shifting the integer pixel B 3 bits to left, a twenty fifth addition step of performing an addition operation on an operation result of the sixteenth shifting step and an addition result of the fourteenth shifting step, a twenty sixth addition step of performing an addition operation on an operation result of the fifteenth shifting step and an operation result of the tenth AND operation step, and a twenty seventh addition step of performing an addition operation on an operation result of the twenty fifth addition step and an operation result of the twenty sixth addition step.

Preferably, the fourth sub-step may comprise an eleventh AND operation step of performing an AND operation on an operation result of the twenty seventh addition step and the motion vector dx, a twelfth AND operation step of performing an AND operation on the operation result of the twenty seventh addition step and the motion vector dx, a thirteenth AND operation step of performing an AND operation on the operation result of the twenty seventh addition step and the motion vector dx, a seventeenth shifting step of performing an operation of shifting an operation result of the eleventh AND operation step 2 bits to left, an eighteenth shifting step of performing an operation of shifting an operation result of the twelfth AND operation step 1 bit to left, a twenty eighth addition step of performing an addition operation on a rounding coefficient of 32 and an operation result of the seventeenth shifting step, a twenty ninth addition step of performing an addition operation on an operation result of the eighteenth shifting step and an operation result of the thirteenth AND operation step, and a thirtieth addition step of performing an addition operation on an operation result of the twenty eighth addition step and an operation result of the twenty ninth addition step.

Therefore, the high-speed motion compensation apparatus and method can reduce the number of accesses to memory by efficiently managing overlapping reference pixels and efficiently aligning reference pixels distributed in word addresses, thus improving the performance of motion compensation.

Accordingly, the high-speed motion compensation apparatus according to the embodiment of the present invention can reduce the number of accesses to memory by efficiently managing overlapping reference pixels and efficiently aligning reference pixels distributed in word addresses, thus improving the performance of motion compensation.

Further, the high-speed motion compensation method according to the embodiment of the present invention can reduce the number of accesses to memory by efficiently managing overlapping reference pixels and efficiently aligning reference pixels distributed in word addresses, thus improving the performance of motion compensation.

BRIEF DESCRIPTION OF THE DRAWINGS

The above and other objects, features and other advantages of the present invention will be more clearly understood from the following detailed description taken in conjunction with the accompanying drawings, in which:

FIG. 13 is a diagram showing the processing ability of the high-speed motion compensation apparatus of FIG. 5.

DESCRIPTION OF THE PREFERRED EMBODIMENTS

Figure 1A:
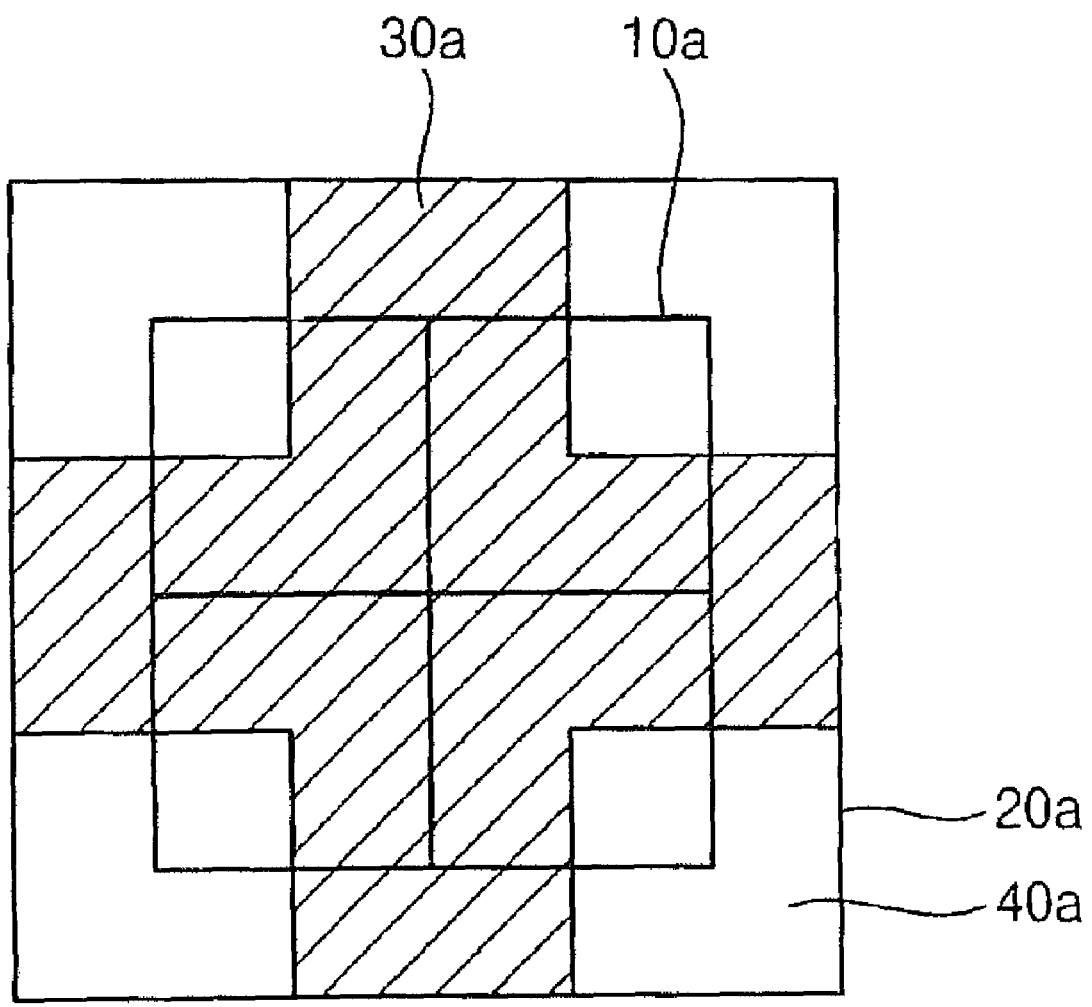
FIGS. 1A and 1B are diagrams showing reference pixels based on the partitioning of sub-macroblocks.
Figure 1B:
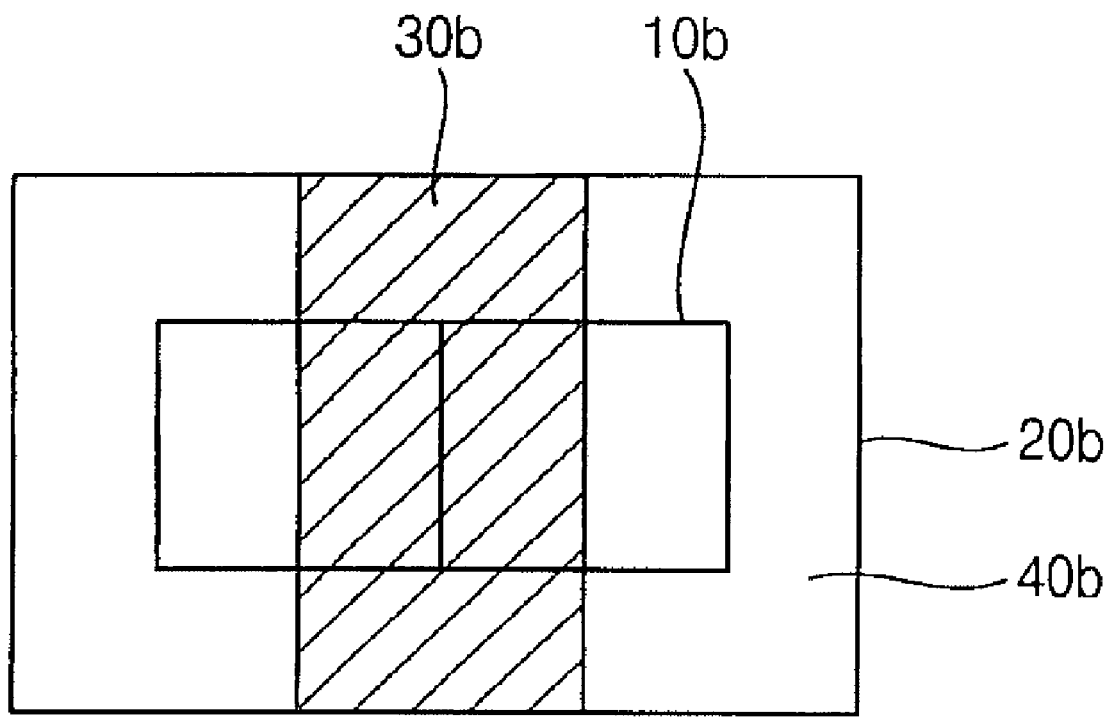
Figure 2A:
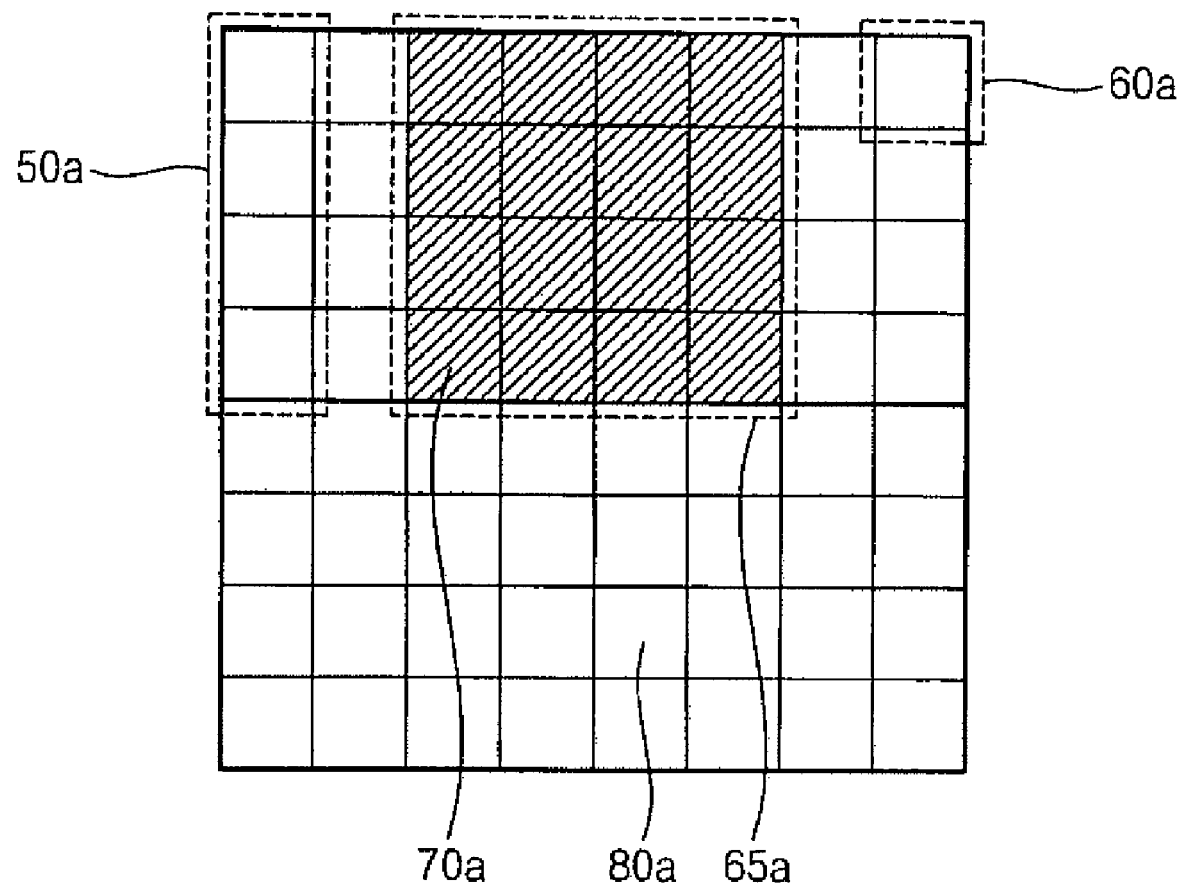
FIGS. 2A and 2B are diagrams showing reference pixels distributed in word addresses.
Figure 2B:
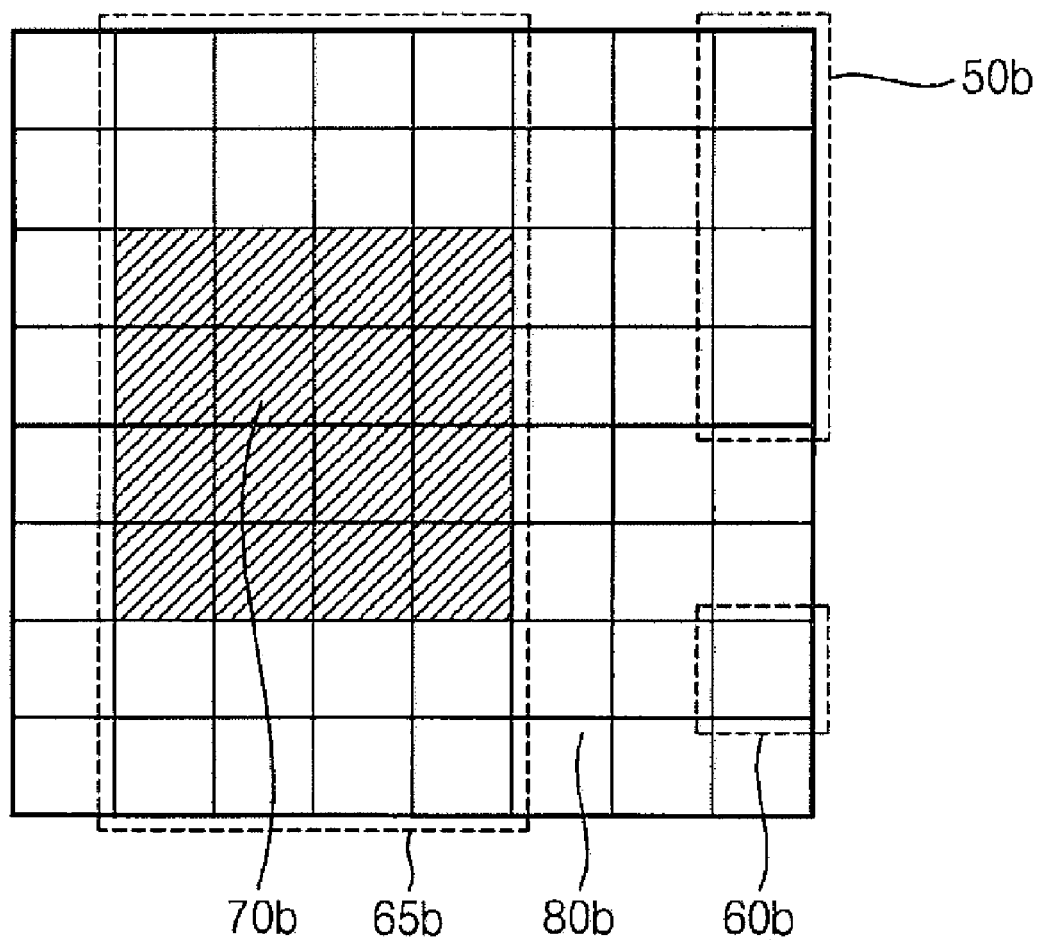

In the embodiments of the present invention disclosed in the present specification, specific structural or functional descriptions are intended to describe only the embodiments of the present invention, the embodiments of the present invention can be implemented in various forms, and thus the present invention should not be interpreted as being limited to the above embodiments.

The present invention can be variously modified and can have various forms, and specific embodiments are intended to be shown in the drawings and to be described in detail in the specification. However, this is not intended to limit the present invention to specific embodiments, and it should be understood that the present invention includes all modifications, equivalents or replacements included in the spirit and scope of the present invention. At the time of describing respective drawings, the same reference numerals are used throughout the different drawings to designate the same or similar components.

Terms, such as "first" and "second," can be used to describe various components, but the components are not limited by the terms the terms are merely used to distinguish one component from another component. For example, the first component can be designated as the second component without departing from the scope of the present invention, and, similarly, the second component can also be designated as the first component.

When it is stated that a specific component is "connected" or "coupled" to another component, it should be understood that the specific component can be directly connected or linked, but other components may be interposed between the specific component and the other component. In contrast, when it is stated that a specific component is "directly connected" or "directly coupled" to another component, it should be understood that no other components are interposed between the specific component and the other component. Other expressions for describing the relationship between components, that is, "between", and "immediately between", or "adjacent to", and "immediately adjacent to", should be interpreted using the same method.

The terms used in the present specification are used only to describe specific embodiments, and are not intended to limit the present invention. Singular expressions may include the meaning of plural expressions as long as there is no definite difference therebetween in the context. In the present application, it should be understood that terms such as "include" or "have", are intended to indicate that proposed features, numbers, steps, operations, components, parts, or combinations thereof exist, and the probability of existence or addition of one or more other features, steps, operations, components, parts or combinations thereof is not excluded thereby.

As long as all of the terms used here, including technical or scientific terms, are not defined otherwise, the terms have the same meaning as terms generally understood by those skilled in the art. The terms, defined in generally used dictionaries, should be interpreted as having the same meaning as the terms in the context of related arts, and are not to be interpreted to have meanings that are ideal or are excessively formal, when the terms are not explicitly defined in the present specification.

Hereinafter, embodiments of the present invention will be described in detail with reference to the attached drawings. In the drawings, the same reference numerals are used throughout the different drawings to designate the same or similar components, and repeated description of the same components is omitted.

Embodiments

Figure 3A:
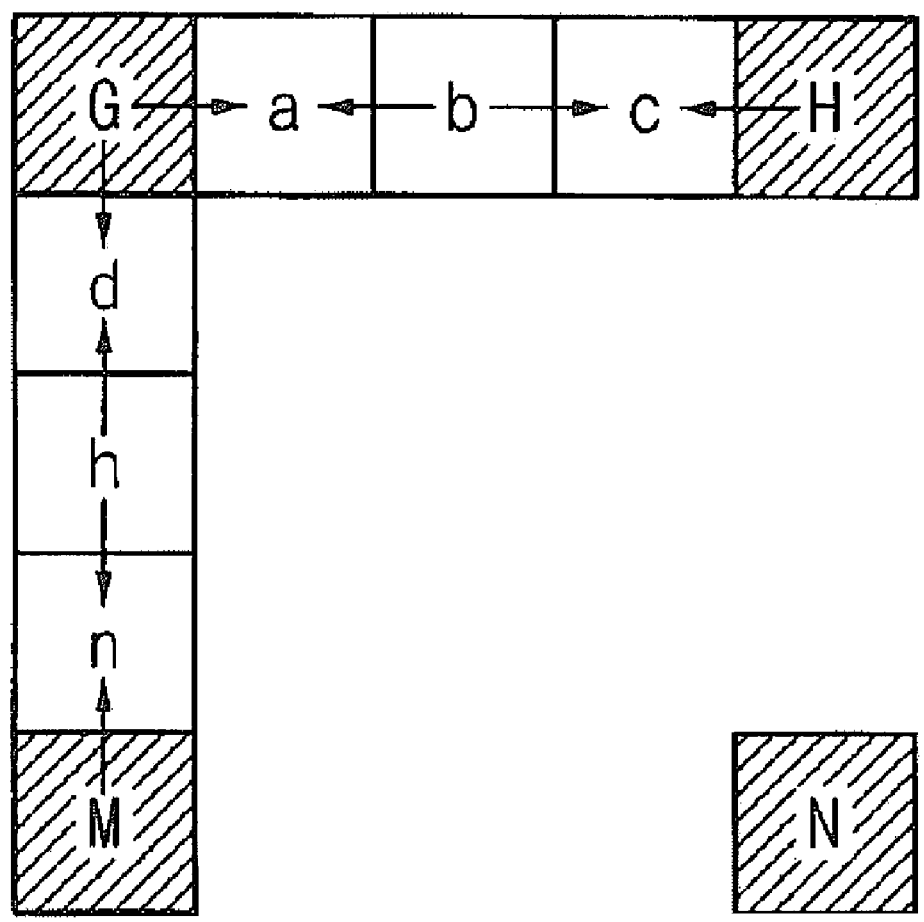
FIGS. 3A, 3B and 3C are diagrams showing reference pixels used according to sub-pixels to be generated.
Figure 3B:
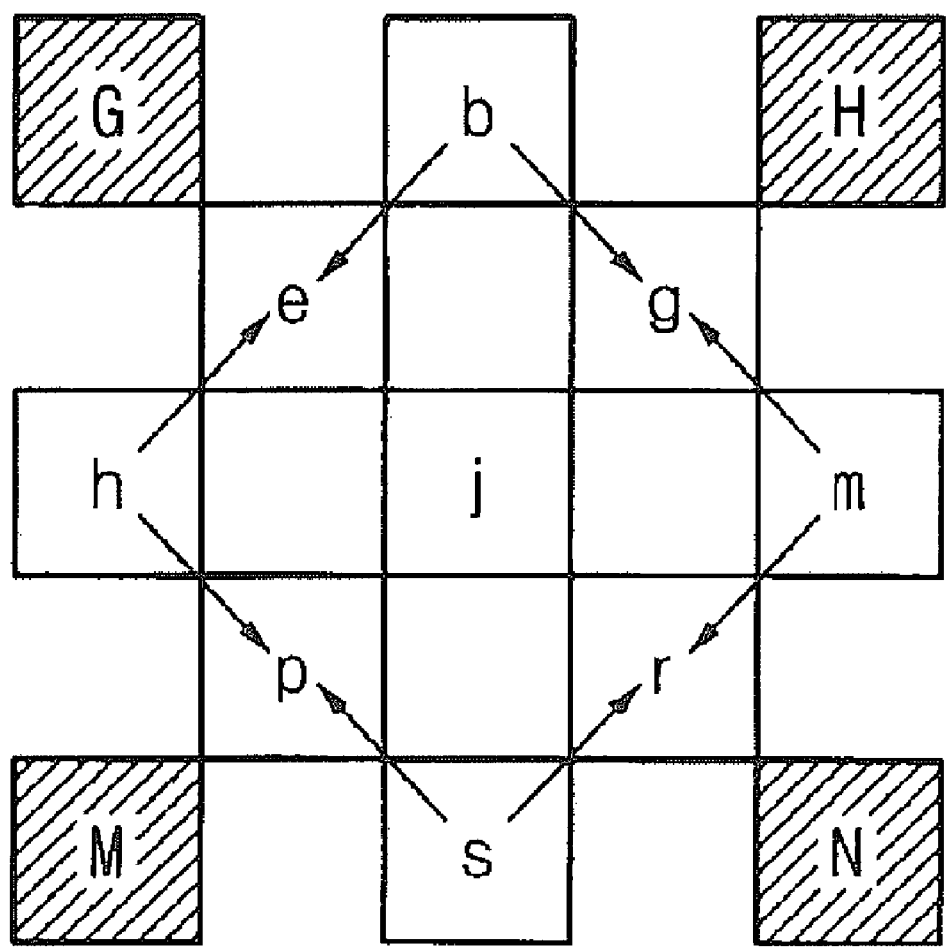
Figure 3C:
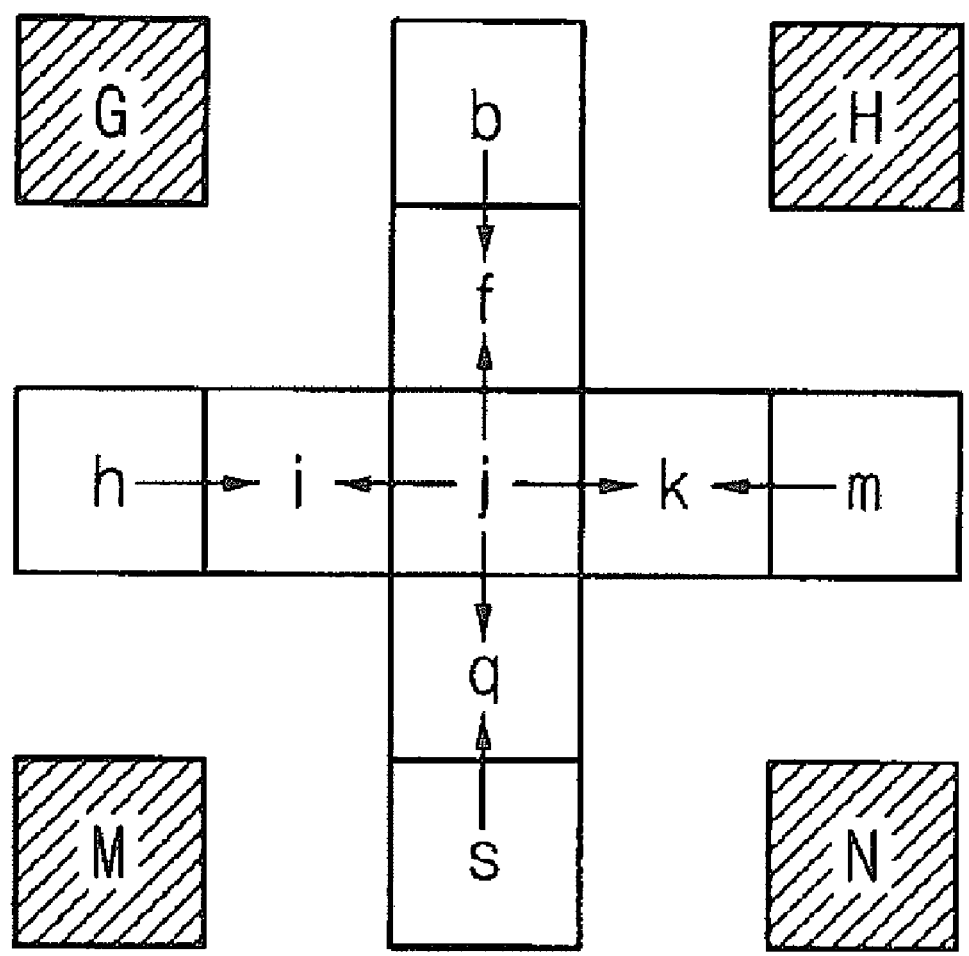

FIGS. 3A, 3B, and 3C are diagrams showing reference pixels used according to sub-pixels to be generated.

Referring to FIGS. 3A, 3B and 3C, pixels G, H, M, and N are reference pixels retrieved from a reference frame, and pixels a, b, c, d, e, f, g, h, I, j, k, m, n, p, q, r, and s are sub-pixels generated through motion compensation.

The reference pixels G, H, M, and N are integer pixels, the sub-pixels b, h, s, and m are first half pixels, and a sub-pixel j is a second half pixel The sub-pixels a, c, d, and n are first quarter pixels, and the sub-pixels e, f, g, i, k, p, q, and r are second quarter pixels.

FIGS. 4A, 4B, 4C, and 4D are diagrams showing the number of reference pixels required for motion compensation according to sub-pixels to be generated.

Referring to FIGS. 4A, 4B, 4C, and 4D, shaded pixels 90*a*, 90*b*, 90*c*, and 90*d* denote sub-pixels generated through motion compensation.

Figure 4A:
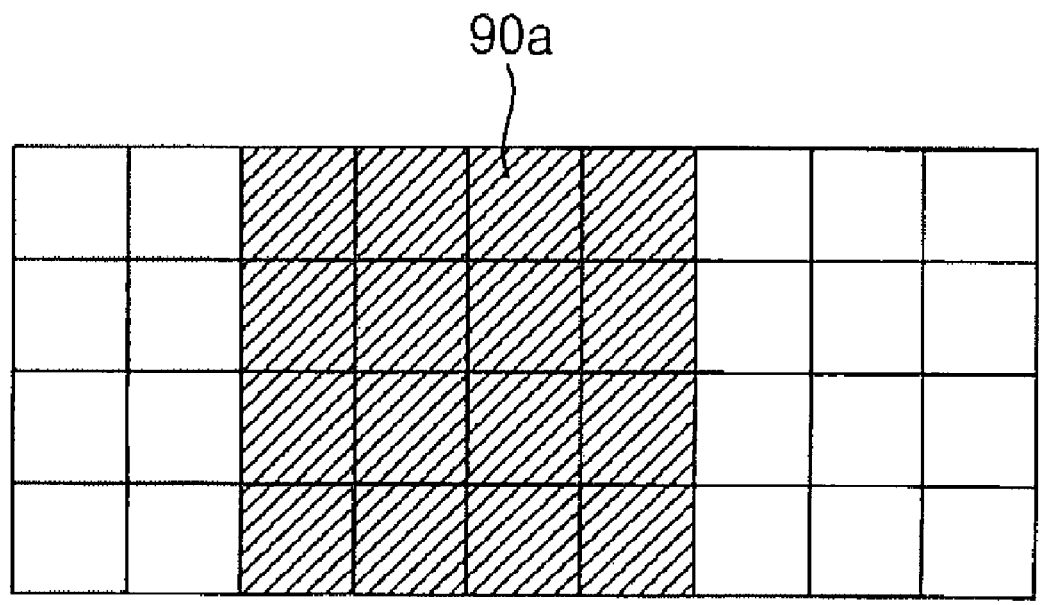
FIGS. 4A, 4B, 4C and 4D are diagrams showing the number of reference pixels required for motion compensation according to sub-pixels to be generated.
Figure 4B:
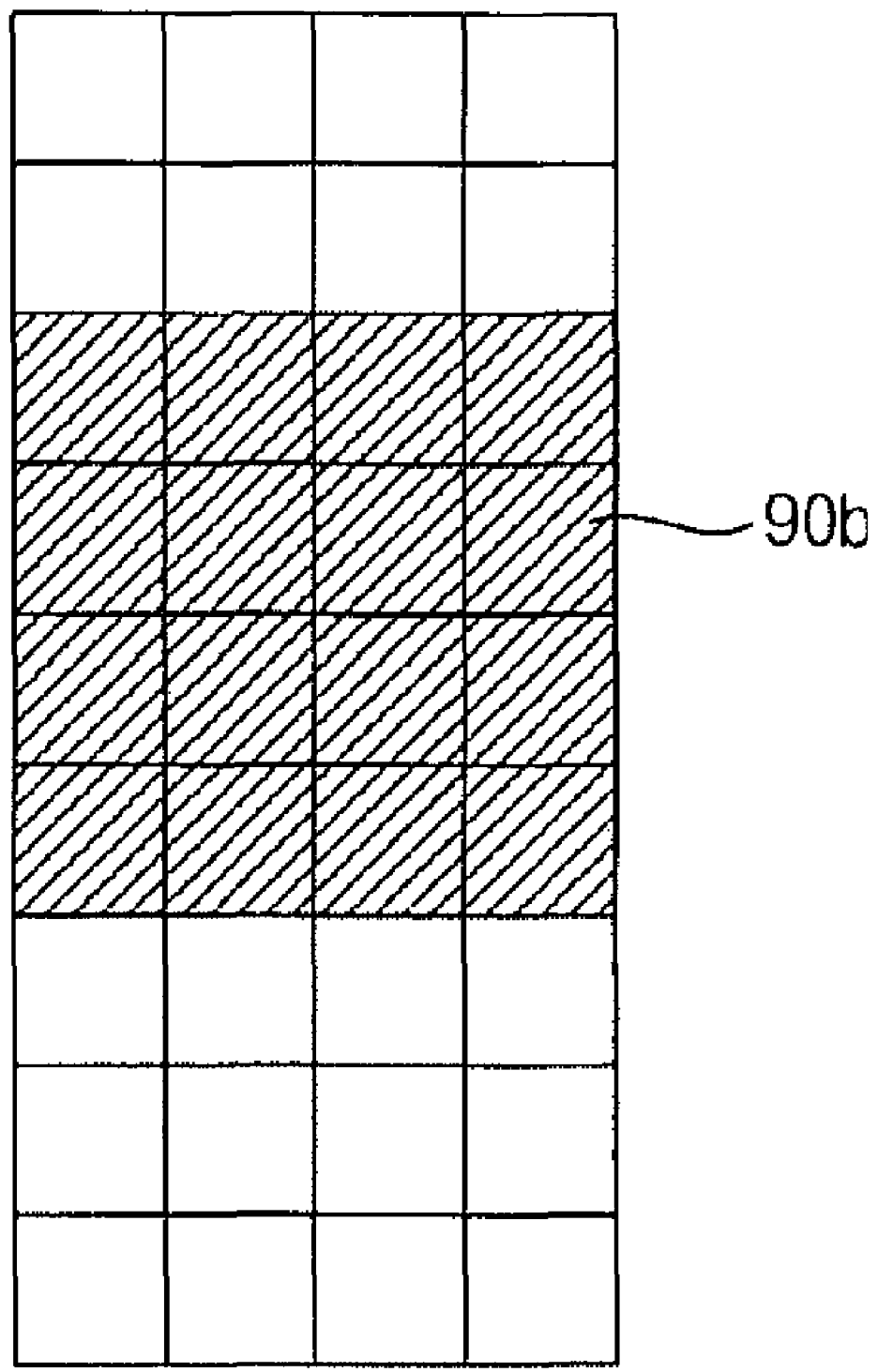
Figure 4C:
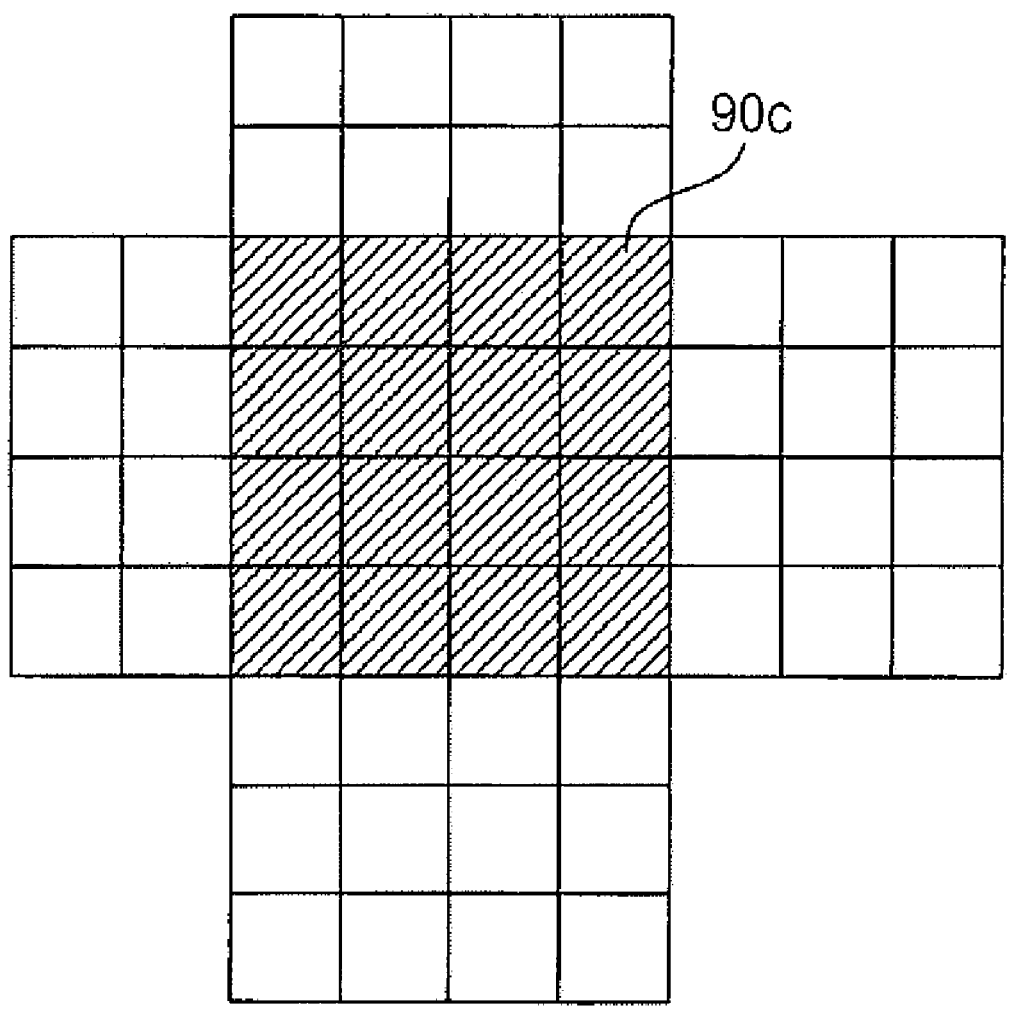
Figure 4D:
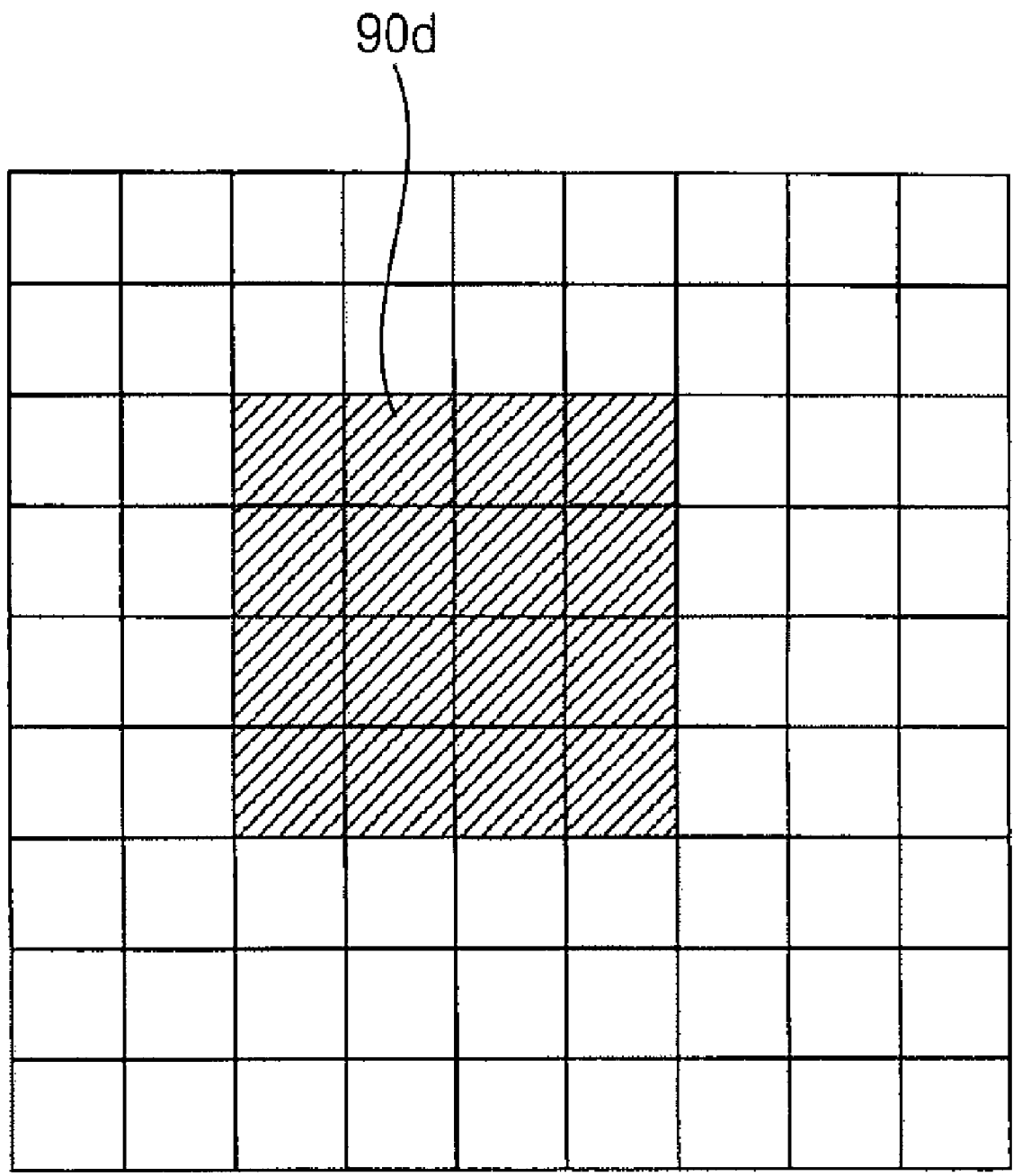

Generally, in order to generate sub-pixels, a number of reference pixels greater than the number of sub-pixels is required. For example, in order to generate sub-pixels, such as the horizontally arranged sub-pixels a, b, and c, as shown in FIGS. 3A, 3B, and 3C, in a number of 4×4, 4×9 reference pixels are required, as shown in FIG. 4A. In order to generate sub-pixels, such as vertically arranged sub-pixels d, h, and n, as shown in FIGS. 3A, 3B, and 3C, in a number of 4×4, 9×4 reference pixels are required, as shown in FIG. 4B. Further, in order to generate sub-pixels, such as a sub-pixel j, arranged at the center, as shown in FIGS. 3A, 3B, and 3C, in a number of 4×4, a number of reference pixels, as shown in FIG. 4C, is required. In order to generate sub-pixels, such as diagonally arranged sub-pixels e, g, p, r, f, i, k, and q, as shown in FIGS. 3A, 3B, and 3C, in a number of 4×4, 9×9 reference pixels are required, as shown in FIG. 4D.

Figure 5:
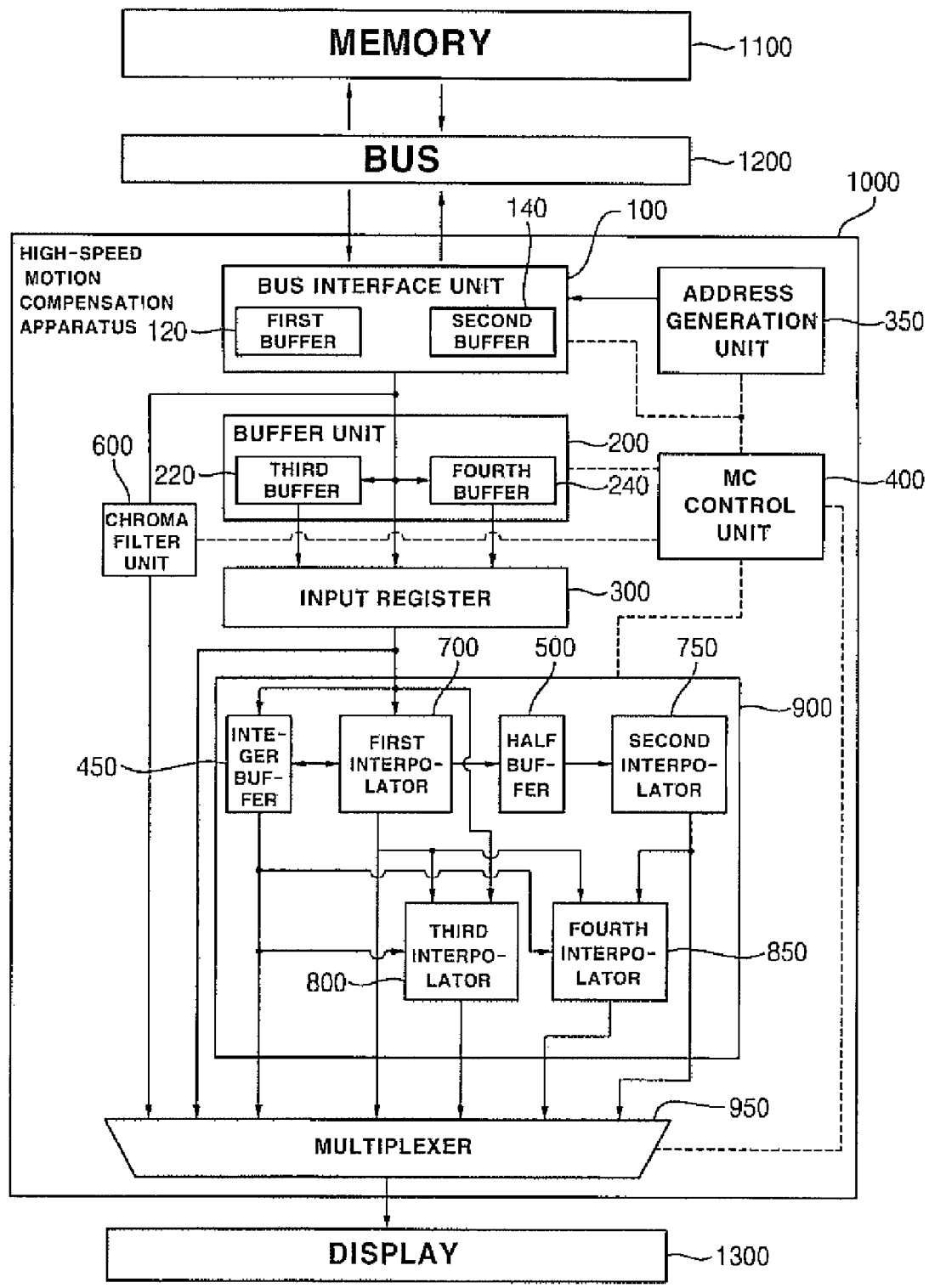
FIG. 5 is a block diagram showing a high-speed motion compensation apparatus according to an embodiment of the present invention.

FIG. 5 is a block diagram showing a high-speed motion compensation apparatus according to an embodiment of the present invention.

Referring to FIG. 5, a high-speed motion compensation apparatus 1000 includes a bus interface unit 100, a buffer unit 200, an interpolation unit 900, a chroma filter unit 600, an input register 300, an address generation unit 350, and a Motion Compensation (MC) control unit 400. The bus interface unit 100 includes a first buffer 120 and a second buffer 140, and the buffer unit 200 includes a third buffer 220 and a fourth buffer 240. The interpolation unit 900 includes a first interpolator 700, a second interpolator 750, a third interpolator 800, a fourth interpolator 850, an integer buffer 450, and a half buffer 500.

The MC controller unit 400 controls the components of the high-speed motion compensation apparatus 1000, that is, the bus interface unit 100, the buffer unit 200, the input register 300, the address generation unit 350, the interpolation unit 900, and the chroma filter unit 600. The address generation unit 350 converts the locations of the reference pixels, obtained using motion vectors, into memory addresses. The bus interface unit 100 accesses a reference frame present in external memory 1100 through a bus 1200, and reads reference pixels from the reference frame. The reference pixels, retrieved through the bus 1200, are aligned and temporarily stored in the first buffer 120 and the second buffer 140, included in the bus interface unit 100.

Thereafter, the reference pixels, output from the bus interface unit 100 for motion compensation, are provided to the input register 300 through the buffer unit 200. The buffer unit 200 includes the third buffer 220 and the fourth buffer 240. The high-speed motion compensation apparatus 1000 stores and manages overlapping reference pixels, among the reference pixels used to generate respective sub-pixels, in the third and fourth buffers 220 and 240.

The high-speed motion compensation apparatus 1000 directly outputs reference pixels, output from the input register 300, without passing through the interpolation unit 900, in an integer mode, in which integer pixels are generated in luminance (luma) components. In a horizontal mode, a vertical mode, and a diagonal mode, in which first half pixels, second half pixels, first quarter pixels, and second quarter pixels are used in luma components, the first interpolator 700, the second interpolator 750, the third interpolator 800, and the fourth interpolator 850 of the interpolation unit 900 generate and output first half pixels, second half pixels, first quarter pixels, and second quarter pixels, respectively, using the reference pixels output from the input register 300. Further, the high-speed motion compensation apparatus 1000 generates and outputs chroma pixels through the chroma filter unit 600 using the reference pixels output from the bus interface unit 100 and motion vectors in order to generate chrome pixels in chrominance (chroma) components. Thereafter, the high-speed motion compensation apparatus 1000 outputs the integer pixels, the first half pixels, the second half pixels, the first quarter pixels, the second quarter pixels, and the chroma pixels to a display 1300 through a multiplexer 950, and recovers the current frame using the pixels.

Figure 6A:
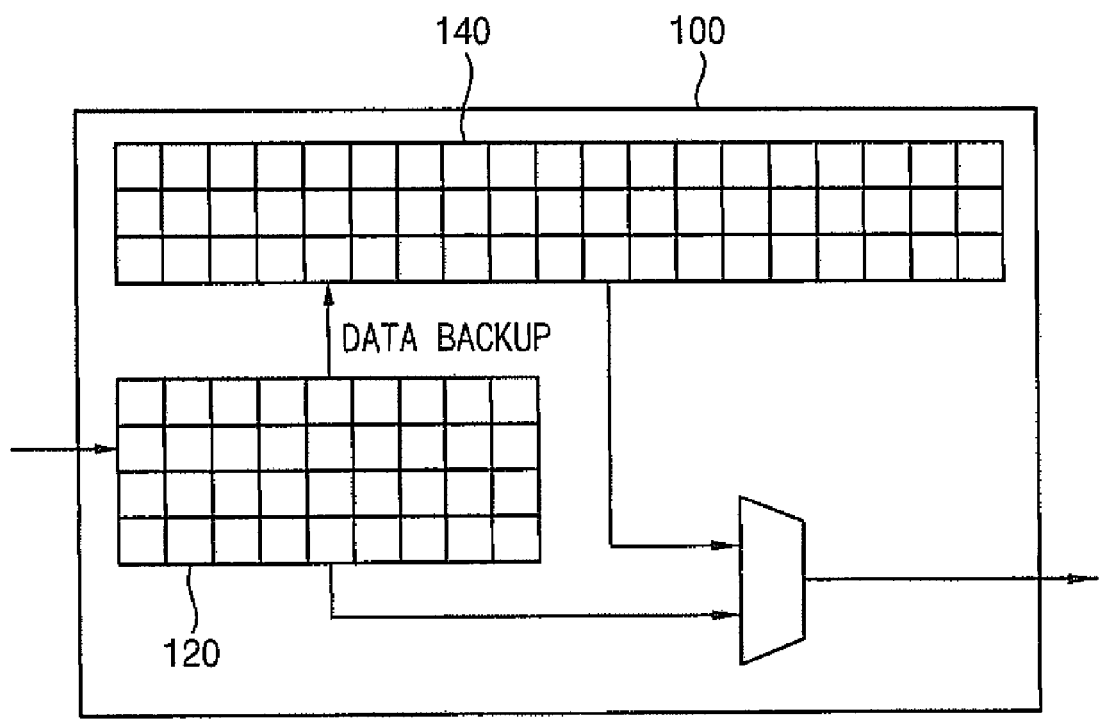
FIG. 6A is a diagram showing the bus interface unit of the high-speed motion compensation apparatus of FIG. 5.

FIG. 6A is a diagram showing the bus interface unit of the high-speed motion compensation apparatus of FIG. 5.

Referring to FIG. 6A, the bus interface unit 100 includes a first buffer 120 and a second buffer 140. The reference pixels, retrieved from external memory 1100 through the bus 1200, are aligned and temporarily stored in the first buffer 120 and the second buffer 140. Thereafter, the bus interface unit 100 sequentially outputs the aligned and temporarily stored reference pixels. When motion compensation is performed on the basis of a sub-macroblock composed of 4×4 sub-pixels, the first buffer 120 may have a storage space capable of storing 4×9 pixels, and the second buffer 240 may have a storage space capable of storing 3×21 pixels. The storage space of the first or the second buffer 120 or 140 can be variously implemented according to the size of the sub-macroblock.

Figure 6B:
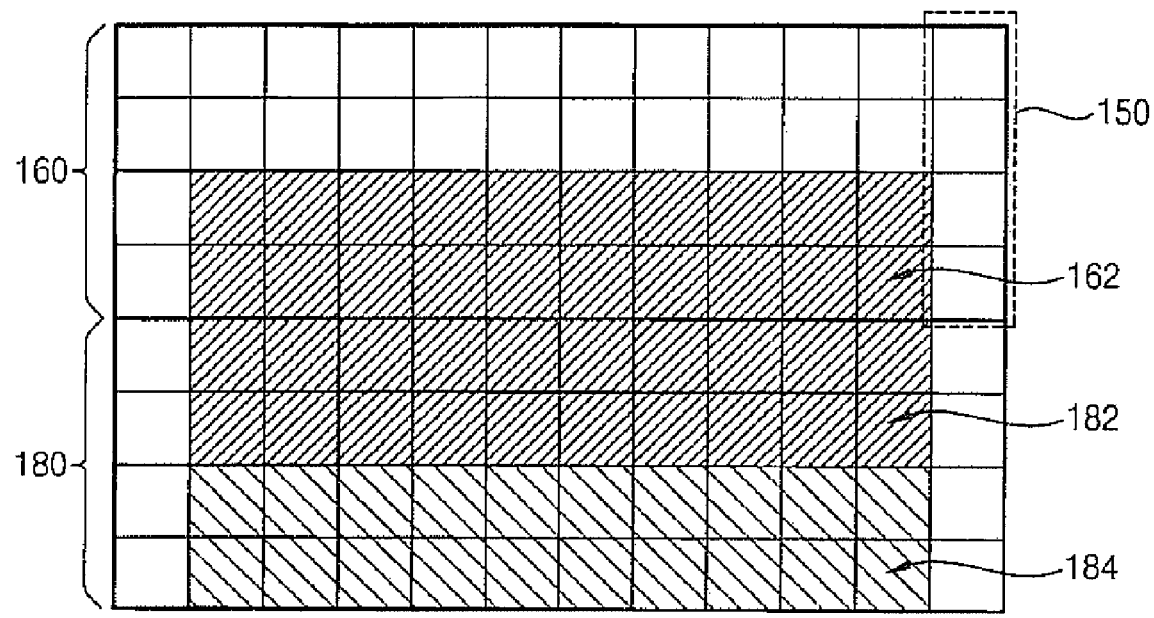
FIG. 6B is a diagram showing a single example in which reference pixels, input to the bus interface unit of FIG. 6A, are distributed in word addresses.
Figure 7A:
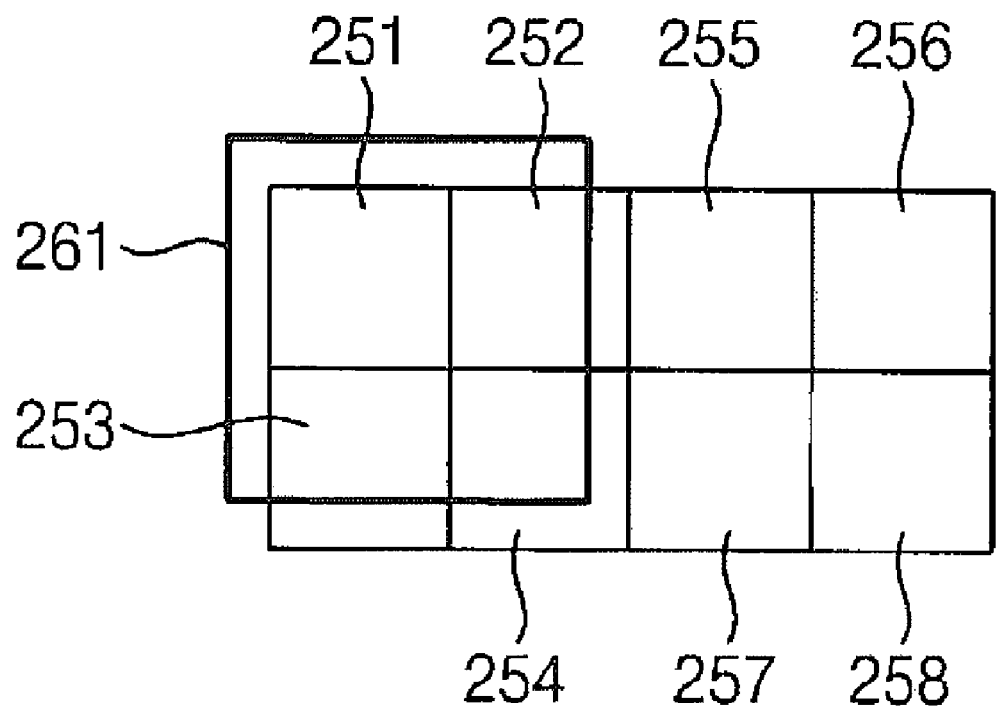
FIGS. 7A, 7B, 7C and 7D are diagrams showing overlapping regions stored in the buffer unit of the high-speed motion compensation apparatus of FIG. 5.
Figure 7B:
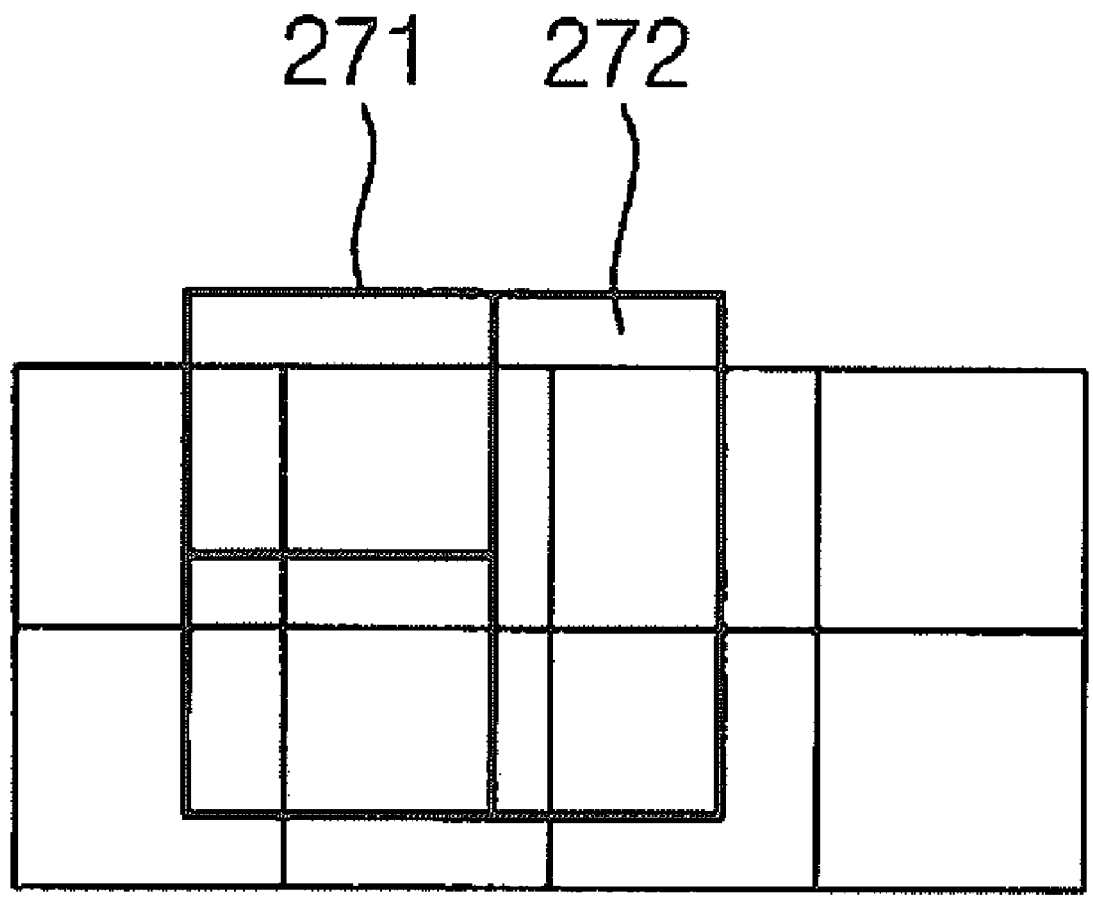
Figure 7C:
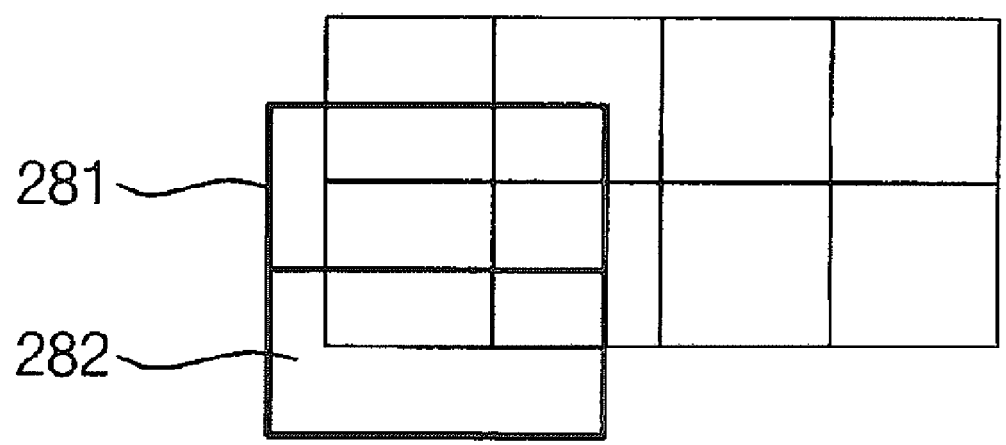
Figure 7D:
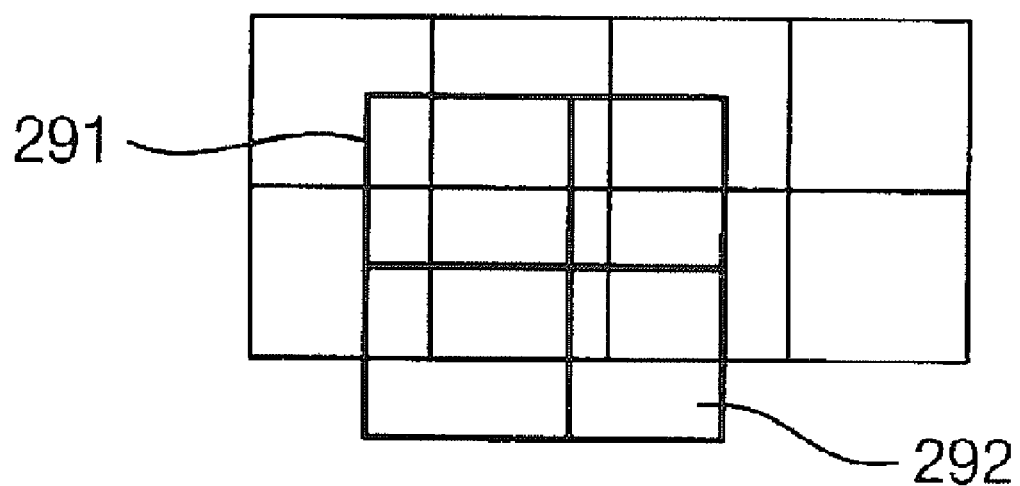

FIG. 6B is a diagram showing an example in which reference pixels, input to the bus interface unit of FIG. 6A, are distributed in word addresses.

Referring to FIG. 6B, a single pixel indicates 8 bits, and a 32-bit word 150 includes four pixels. The reference pixels required for motion compensation are distributed over a first region 160 and a second region 180, each composed of word addresses. The first and second sub-regions 162 and 182 denote reference pixels required for current motion compensation, and a third sub-region 184 denotes reference pixels required for subsequent motion compensation.

The reference pixels required for motion compensation are generally distributed over different word regions. For example, as shown in FIG. 6B, when reference pixels are distributed over the first region 160 and the second region 180, composed of words, the first buffer 120 sequentially reads 9 words from the external memory 1100 through the bus 1200, and temporarily stores the read 9 words. That is, the 9 words included in the first region 160 are sequentially read, so that the first sub-region 162, composed of 2×9 reference pixels, is stored in the first buffer 120. Then, 9 words included in the second region 180 are sequentially read, so that the second sub-region 182, composed of 2×9 reference pixels, is stored in the first buffer 120.

The second region 180 includes the second sub-region 182, composed of reference pixels that are currently used, and the third sub-region 184, composed of reference pixels to be subsequently used. In this case, when the 9 words included in the second region 180 are sequentially read, the third sub-region 184, composed of reference pixels to be subsequently used, is temporarily stored in the second buffer 140 at the same time that the second sub-region 182, composed of reference pixels to be currently used, is stored in the first buffer 120. Therefore, when the reference pixels of the third sub-region 184 are subsequently required for motion compensation, the reference pixels of the third sub-region 184 are output from the second buffer 140 and are used without being read from the external memory 1100 through the bus 1200. Therefore, the problem of alignment of reference data can be solved, and motion compensation can be performed at high speed by utilizing the first buffer 120 and the second buffer 140.

FIGS. 7A, 7B, 7C, and 7D are diagrams showing an overlapping region stored in the buffer unit of the high-speed motion compensation apparatus of FIG. 5.

Referring to FIGS. 7A, 7B, 7C, and 7D, a first sub-macroblock 251, a second sub-macroblock 252, a third sub-macroblock 253, a fourth sub-macroblock 254, a fifth sub-macroblock 255, a sixth sub-macroblock 256, a seventh sub-macroblock 257, and an eighth sub-macroblock 258 denote sub-macroblocks each composed of 4×4 sub-pixels generated through motion compensation. A first reference frame 261, a second reference frame 271, a third reference frame 281, and a fourth reference frame 291 denote reference frames composed of reference pixels required for the first sub-macroblock 251, the second sub-macroblock 252, the third sub-macroblock 253, and the fourth sub-macroblock 254, respectively.

The buffer unit 200 includes the third buffer 220 and the fourth buffer 240. The third buffer 220 is used to generate vertically arranged sub-pixels and diagonally arranged sub-pixels, that is, vertically arranged sub-pixels d, h, and n, and diagonally arranged sub-pixels e, f, g, i, j, k, p, q, and r in FIGS. 3A, 3B, and 3C, and the fourth buffer 240 is used to generate horizontally arranged sub-pixels and diagonally arranged sub-pixels, that is, horizontally arranged sub-pixels a, b, and c and diagonally arranged sub-pixels e, f, g, i, j, k, p, q, and r in FIGS. 3A, 3B, and 3C. Therefore, when the diagonally arranged sub-pixels e, f, g, i, j, k, p, q, and r in FIGS. 3A, 3B, and 3C are generated, the third buffer 220 or the fourth buffer 240 is used.

First, in order to generate the first sub-macroblock 251, composed of 4×4 sub-pixels, the first reference frame 261 is read from the external memory 1100 through the bus 1200. In this case, the reference pixels that are to be used again so as to generate the vertically arranged third sub-macroblock 253 and the diagonally arranged fourth sub-macroblock 254 are stored in the third buffer 220, and the reference pixels that are to be used again so as to generate the horizontally arranged second sub-macroblock 252 are stored in the fourth buffer 240. In this way, when the second sub-macroblock 252 is generated, only a partial reference frame 272 of the second reference frame 271, composed of 8×4 reference pixels, needs to be received from the external memory 1100 through the bus 1200. Similarly, when the third sub-macroblock 253 is generated, only a partial reference frame 282 of the third reference frame 281, composed of 4×8 reference pixels, needs to be newly received. When the fourth sub-macroblock 254 is generated, only a partial reference frame 292 of the fourth reference frame 291, composed of 4×4 reference pixels, needs to be received. Therefore, the third buffer 220 and the fourth buffer 240 are efficiently used, so that overlapping reference pixels are used again, and thus the number of accesses to the external memory 1100 can be reduced, and thus motion compensation can be performed at high speed.

For example, when motion compensation is performed on sub-macroblocks, each composed of 16×16 sub-pixels, the buffer unit 200, including the third buffer 220 capable of storing 5×21 pixels and the fourth buffer 240 capable of storing 9×5 pixels, can be used.

Figure 8A:
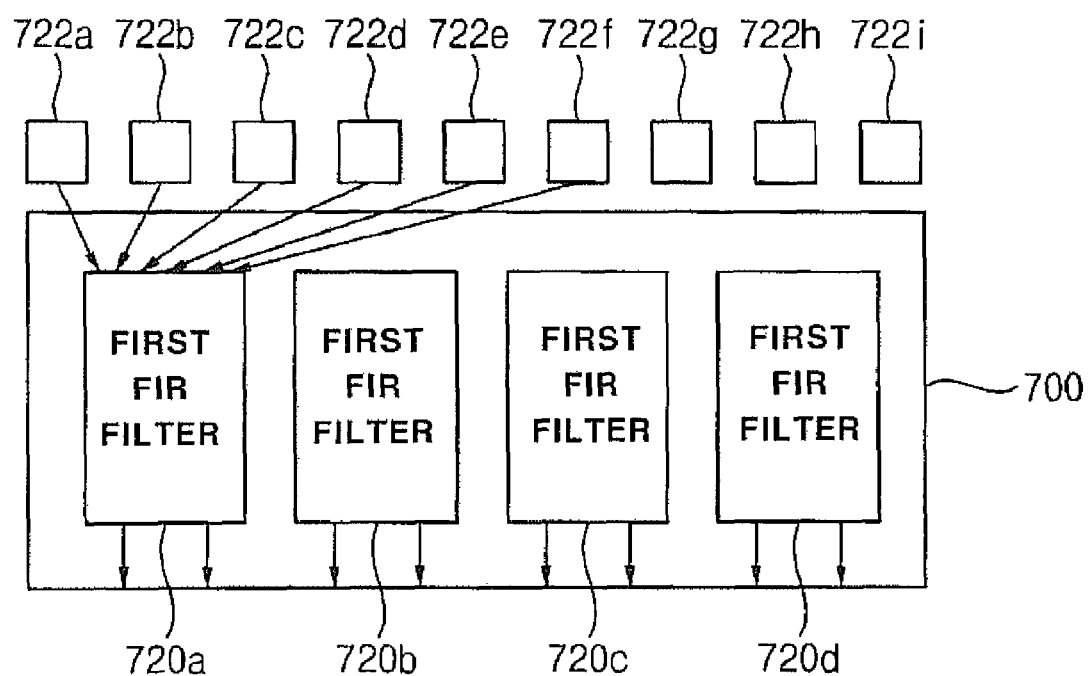
FIG. 8A is a diagram showing the first interpolator of the high-speed motion compensation apparatus of FIG. 5.

FIG. 8A is a diagram showing the first interpolator of the high-speed motion compensation apparatus of FIG. 5.

Referring to FIG. 8A, the first interpolator 700 includes four first Finite Impulse Response (FIR) filters 720a, 720b, 720c, and 720d for performing 6-tap FIR filtering.

The first FIR filters 720a, 720b, 720c, and 720d receive integer pixels 722a, 722b, 722c, 722d, 722e, 722f, 722g, 722h, and 722i.

In order to obtain first half pixels in luma components, 6-tap FIR filtering must be performed. The 6-tap FIR filtering is performed based on Equation [1a], $$1hp = \min(255, \max(0, (p0-5p1+20p2+20p3-5p4+p5+16)>>5)) \quad [1a]$$

where p0, p1, p2, p3, p4, and p5 denote 8-bit integer pixels, and 1hp denotes an 8-bit first half pixel.

In order to obtain a single first half pixel, 6 integer pixels are required. When four first half pixels are generated, there is a need to repeatedly use adjacent integer pixels, so that 9 integer pixels 722a, 722b, 722c, 722d, 722e, 722f, 722g, 722h, and 722i are actually required. As shown in FIG. 8A, the first interpolator includes four first FIR filters 720a, 720b, 720c, and 720d to generate the first half pixels, and receives 9 integer pixels 722a, 722b, 722c, 722d, 722e, 722f, 722g, 722h, and 722i. Among the 9 integer pixels 722a to 722i input to the first interpolator, 6 integer pixels are input to the first FIR filters 720a, 720b, 720c, and 720d, and 4 first half pixels, generated by the first FIR filters 720a, 720b, 720c, and 720d, are processed and output within a single clock cycle.

Figure 8B:
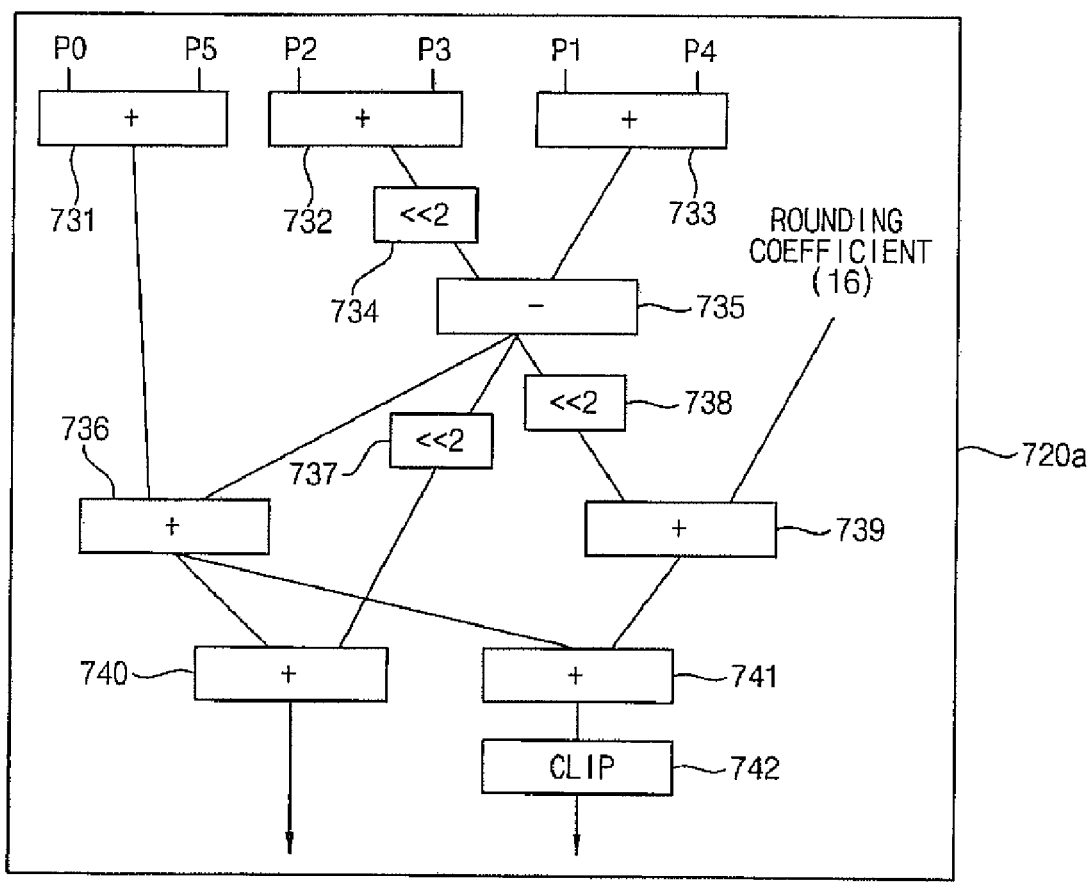
FIG. 8B is a diagram showing the structure of the first FIR filters of the first interpolator of FIG. 8A.

FIG. 8B is a diagram showing the structure of the first FIR filters of the first interpolator of FIG. 8A.

Referring to FIG. 8B, each of the first FIR filters 720a, 720b, 720c, and 720d includes a first adder 731, a second adder 732, a third adder 733, a fourth adder 736, a fifth adder 739, a sixth adder 740, a seventh adder 741, a first subtractor 735, a first shifter 734, a second shifter 737, a third shifter 738, and a first clip unit 742.

Equation [1a] is converted into Equation [1b] through the development thereof, and respective structures of the first FIR filters 720a, 720b, 720c, and 720d are implemented using the following Equation [1b], $$1hp = \min(255, \max(0, ((p0+p5) + (4(p2+p3)-(p1+p4)) + 4(4(p2+p3)-(p1+p4))+16) >> 5)) \quad [1b]$$

where p0, p1, p2, p3, p4, and p5 denote 8-bit integer pixels, and 1hp denotes an 8-bit first half pixel.

Referring to Equation [1b], the operation result of a term (p0+p5)+(4(p2+p3)−(p1+p4))+4(4(p2+p3)−(p1+p4)) is transmitted to the half buffer 500 so as to generate second half pixels. In this case, since the operation result of a term 4(p2+p3)−(p1+p4) may have a positive (+) or negative (−) value, it must have at least 15 bits. Therefore, an output value corresponding to the operation result of the term (p0+p5)+(4(p2+p3)−(p1+p4))+4(4(p2+p3)−(p1+p4)) has a value of 15 or more bits. That is, the out-out value transmitted to the half buffer 500 has a value of 15 or more bits.

Further, a portion corresponding to the operation result of a term (p0+p5)+(4(p2+p3)−(p1+p4))+4(4(p2+p3)−(p1−p4))+16 is an output value required to generate the first half pixels. Further, a portion corresponding to the operation result is transmitted to the third interpolator 800 to generate the first quarter pixels. When the operation result value falls within a range from 0 to 255, the first clip unit 742 outputs the operation result value without change, when the operation result value is less than 0, the first clip unit 742 outputs 0, and, when the operation result value is greater than 255, the first clip unit outputs 255. That is, the first clip unit 742 clips the operation result value, thus adjusting the result value to an 8-bit value. Therefore, the output values of the first clip unit 742 are 8-bit values, and are first half pixels.

The first adder 731 performs an addition operation on p0 and p5, the second adder 732 performs an addition operation on p2 and p3, and the third adder 733 performs an addition operation on p1 and p4. The first shifter 734 performs an operation of shifting the operation result of the second adder 732 2 bits to the left, the first subtractor 735 performs a subtraction operation on the operation result of the first shifter 734 and the operation result of the third adder 733, and the fourth adder 736 performs an addition operation on the operation result of the first adder 731 and the operation result of the first subtractor 735. The second shifter 737 performs an operation of shifting the operation result of the first subtractor 735 2 bits to the left, and the third shifter 738 performs an operation of shifting the operation result of the first subtracter 735 2 bits to the left. The fifth adder 739 performs an addition operation on the operation result of the third shifter 738 and a rounding coefficient of 16. The sixth adder 740 performs an addition operation on the operation result of the second shifter 737 and the operation result of the fourth adder 736, and outputs the operation result thereof to the half buffer 500. The seventh adder 741 performs an addition operation on the operation result of the fourth adder 736 and the operation result of the fifth adder 739, and the first clip unit 742 outputs the operation result value of the seventh adder 741 without change when the operation result value falls within a range from 0 to 255, outputs 0 when the operation result value is less than 0, and outputs 255 when the operation result value is greater than 255.

Figure 9A:
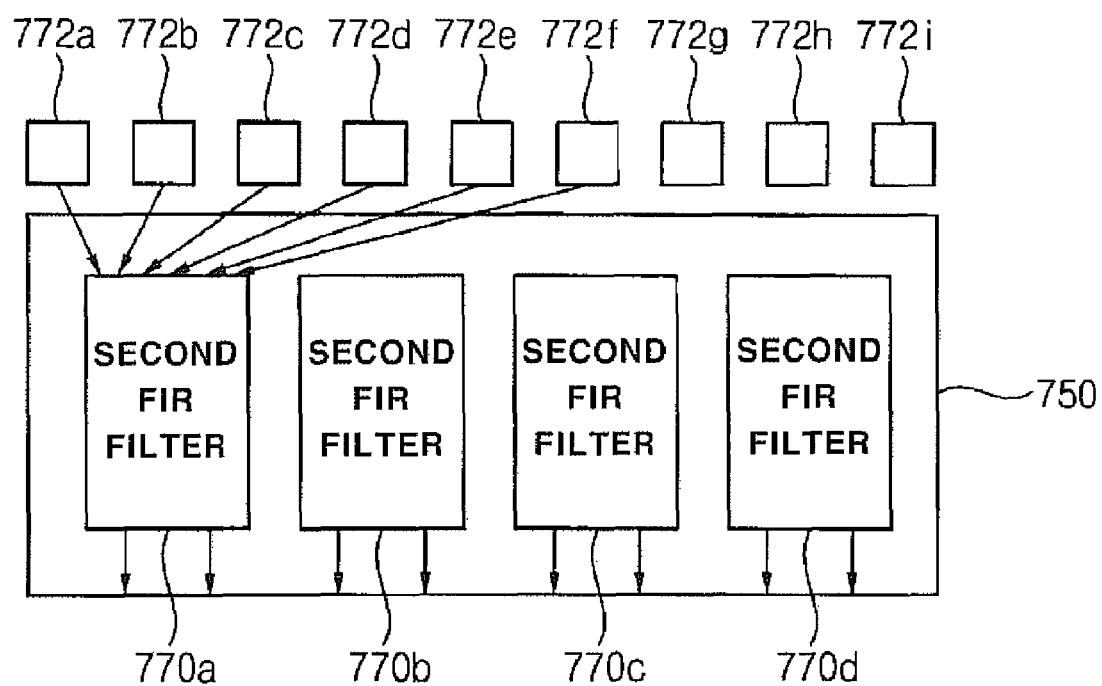
FIG. 9A is a diagram showing the second interpolator of the high-speed motion compensation of FIG. 5.

FIG. 9A is a diagram showing the second interpolator of the high-speed motion compensation apparatus of FIG. 5.

Referring to FIG. 9A, the second interpolator 750 includes four second FIR filters 770a, 770b, 770c, and 770d for performing 6-tap FIR filtering.

The second FIR filters 770a, 770b, 770c, and 770d receive 15-bit first half pixels 772a, 772b, 772c, 772d, 772e, 772f, 772g, 772h, and 772i, output from the half buffer. In order to obtain second half pixels in luma components, 6-tap FIR filtering must be performed. The 6-tap FIR filtering is performed on the basis of Equation [2a], $$2hp = \min(255, \max(0, (|HP0-5HP1+20HP2+20HP3-5HP4+HP5|+512)>>10)) \quad [2a]$$

where HP0, HP1, HP2, HP3, HP4, and HP5 denote 15-bit first half pixels stored in the half buffer, and 2hp denotes an 8-bit second half pixel.

Each of the 4 first FIR filters 720a, 720b, 720c, and 720d, included in the first interpolator 700, outputs both an operation result, which is clipped by the first clip unit 742 to an 8-bit value, and an operation result, which is not clipped by the first clip unit 742. In this case, output values corresponding to the operation results of the term (p0+p5)+(4(p2+p3)−(p1+p4))+4(4(p2+p3)−(p1+p4)) in Equation [1b], that is, 15-bit output values, are stored in the half buffer 500. Thereafter, the 15-bit output values, stored in the half buffer nine times on a four-pixels-at a time-basis, are input to the second FIR filters 770a, 770b, 770c, and 770d four times on a nine-pixels-at a time-basis, so that 6-tap FIR filtering is performed. The second half pixels are generated to correspond to output values obtained through 6-tap filtering by the second FIR filters 770a, 770b, 770c, and 770d. In this case, in order to generate a single second half pixel, 6 first half pixels, which are not clipped to fall within the range from 0 to 255 by the first clip unit 742, are required.

Figure 9B:
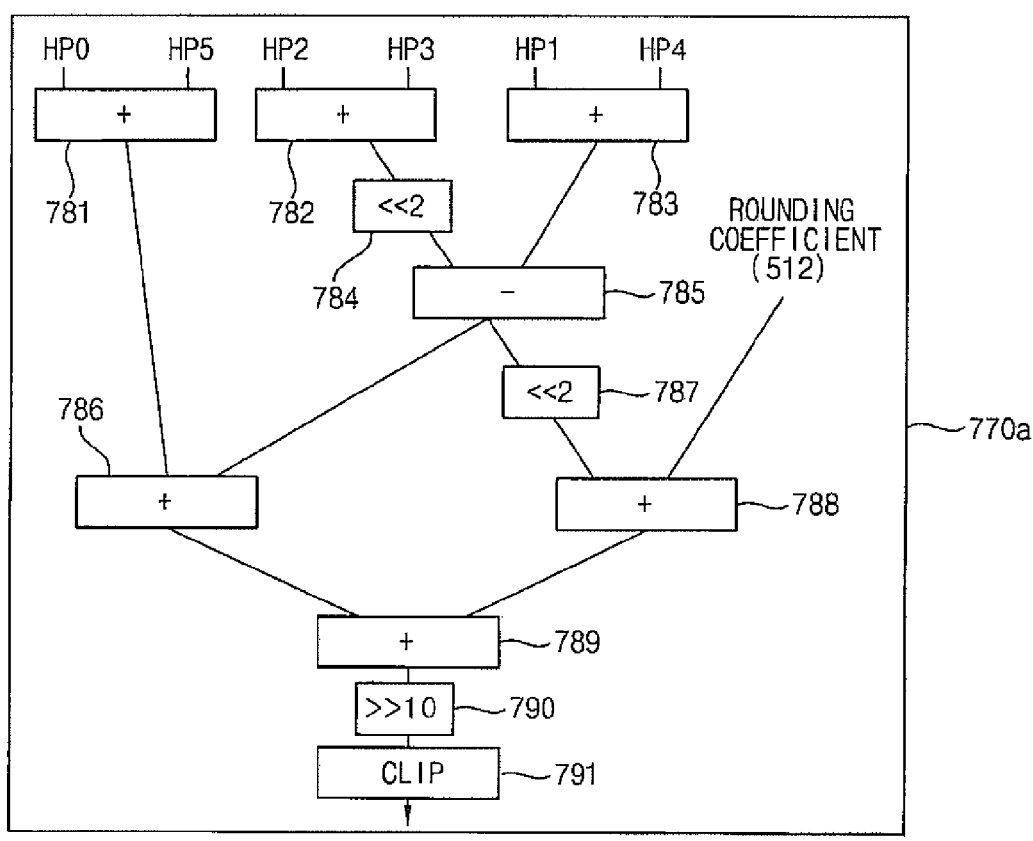
FIG. 9B is a diagram showing the structure of the second FIR filters of the second interpolator of FIG. 9A.

FIG. 9B is a diagram showing the structure of the second FIR filters of the second interpolator of FIG. 9A.

Referring to FIG. 9B, each of the second FIR filters 770a, 770b, 770c, and 770d includes an eighth adder 781, a ninth adder 782, a tenth adder 783, an eleventh adder 786, a twelfth adder 788, a thirteenth adder 789, a second subtractor 785, a fourth shifter 784, a fifth shifter 787, a sixth shifter 790, and a second clip unit 791.

In order to generate 4 second half pixels, 9 first half pixels 772a, 772b, 772c, 772d, 772e, 772f, 772g, 772h, and 772i, each having a 15-bit output value which is not clipped by the first clip unit 742 included in the first interpolator 700, are input to the second FIR filter Thereafter, the four second half pixels, generated by the second FIR filters 770a, 770b, 770c, and 770d, are filtered based on the following Equation [2b], which is a modification of Equation [2a], and are processed and output within a single clock cycle, $$2hp = \min(255, \max(0, ((HP0 + HP5) + (4(HP2 + HP3) - (HP1 + HP4)) + 4(4(HP2 + HP3) - (HP1 + HP4)) + 512) >> 10)) \quad [2b]$$

where HP0, HP1, HP2, HP3, HP4, and HP5 denote 15-bit first half pixels stored in the half buffer, and 2hp denotes an 8-bit second half pixel.

First, the second FIR filters 770a, 770b, 770c, and 770d receive 15-bit first half pixels, which are not clipped by the first clip unit 742, and output second half pixels. As shown in Equations [2a] and [2b], the second FIR filters 770a, 770b, 770c, and 770d use a value of 512 as a rounding coefficient, and shift the operation results thereof 10 bits to the right, thus adjusting the output values thereof to 8 bits and outputting the adjusted values. That is, when the operation result value of each second FIR filter is less than 0, the second FIR filter outputs 0, when the operation result value is greater than 255, the second FIR filter outputs 255, and, when the operation result value falls within a range from 0 to 255, the second FIR filter outputs the operation result value without change.

The eighth adder 781 performs an addition operation on HP0 and HP5, and the ninth adder 782 performs an addition operation on HP2 and HP3. The tenth adder 783 performs an addition operation on HP1 and HP4. The fourth shifter 784 performs an operation of shifting the operation result of the ninth adder 782 2 bits to the left, the second subtractor 785 performs a subtraction operation on the operation result of the fourth shifter 784 and the operation result of the tenth adder 783, and the eleventh adder 786 performs an addition operation on the operation result of the eighth adder 781 and the operation result of the second subtracter 785. The fifth shifter 787 performs an operation of shifting the operation result of the second subtracter 785 2 bits to the left, and the twelfth adder 788 performs an addition operation on the operation result of the fifth shifter 787 and the rounding coefficient of 512. The thirteenth adder 789 performs an addition operation on the operation result of the eleventh adder 786 and the operation result of the twelfth adder 788. The sixth shifter 790 performs an operation of shifting the operation result of the thirteenth adder 789 10 bits to the right, and the second clip unit 791 outputs the operation result value without change when the operation result of the sixth shifter 790 falls within a range from 0 to 255, outputs 0 when the operation result is less than 0, and outputs 255 when the operation result is greater than 255.

Figure 10A:
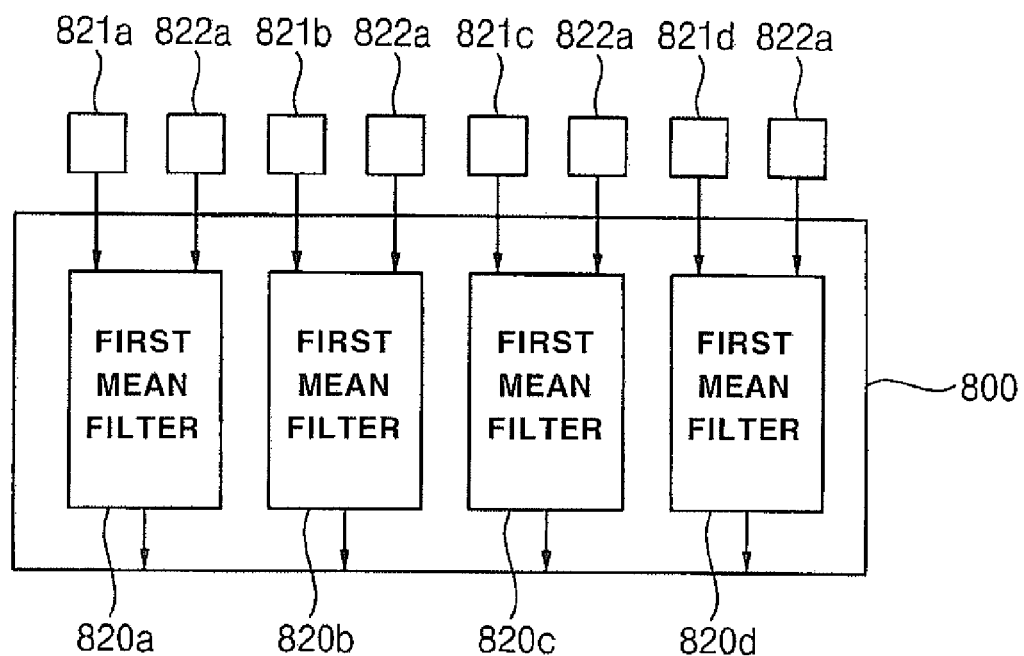
FIG. 10A is a diagram showing the third interpolator of the high-speed motion compensation apparatus of FIG. 5.

FIG. 10A is a diagram showing the third interpolator of the high-speed motion compensation apparatus of FIG. 5.

Referring to FIG. 10A, the third interpolator 800 includes four first mean filters 820a, 820b, 820c, and 820d for performing an operation of obtaining a mean value.

Each of the first mean filters 820a, 820b, 820c, and 820d receives an integer pixel 821a, 821b, 821c, or 821d and a first half pixel 822a, 822b, 822c, or 822d. The first quarter pixels are generated in luma components by obtaining respective mean values of the first half pixels 822a, 822b, 822c, and 822d, which are clipped by the first clip unit 742 of the first interpolator 700 and the integer pixels 821a, 821b, 821c, and 821d, using the third interpolator 800. The third interpolator 800 includes the four first mean filters 820a, 820b, 820c, and 820d, and may generate four first quarter pixels per clock cycle.

Figure 10B:
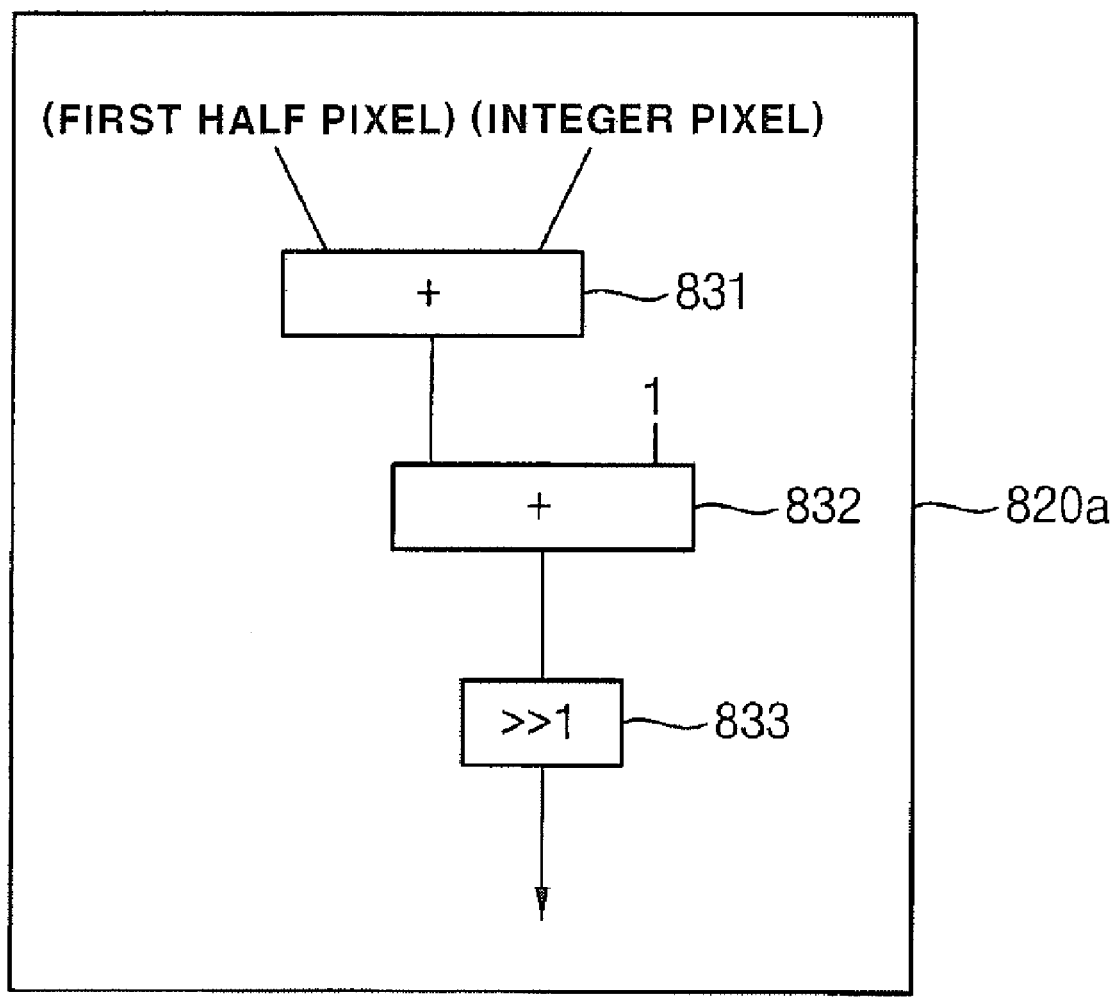
FIG. 10B is a diagram showing the structure of the first mean filters of the third interpolator of FIG. 10A.

FIG. 10B is a diagram showing the structure of the first mean filters of the third interpolator of FIG. 10A.

Referring to FIG. 10B, each of the first mean filters includes a fourteenth adder 831, a fifteenth adder 832, and a seventh shifter 833.

The fourteenth adder 831 performs an addition operation on a first half pixel, clipped by the first clip unit 742, and a corresponding integer pixel, and the fifteenth adder 832 performs an addition operation on the operation result of the fifteenth adder 831 and a rounding coefficient of 1. The seventh shifter 833 performs an operation of shifting the operation result of the fifteenth adder 832 1 bit to the right, thus generating first quarter pixels.

Figure 11A:
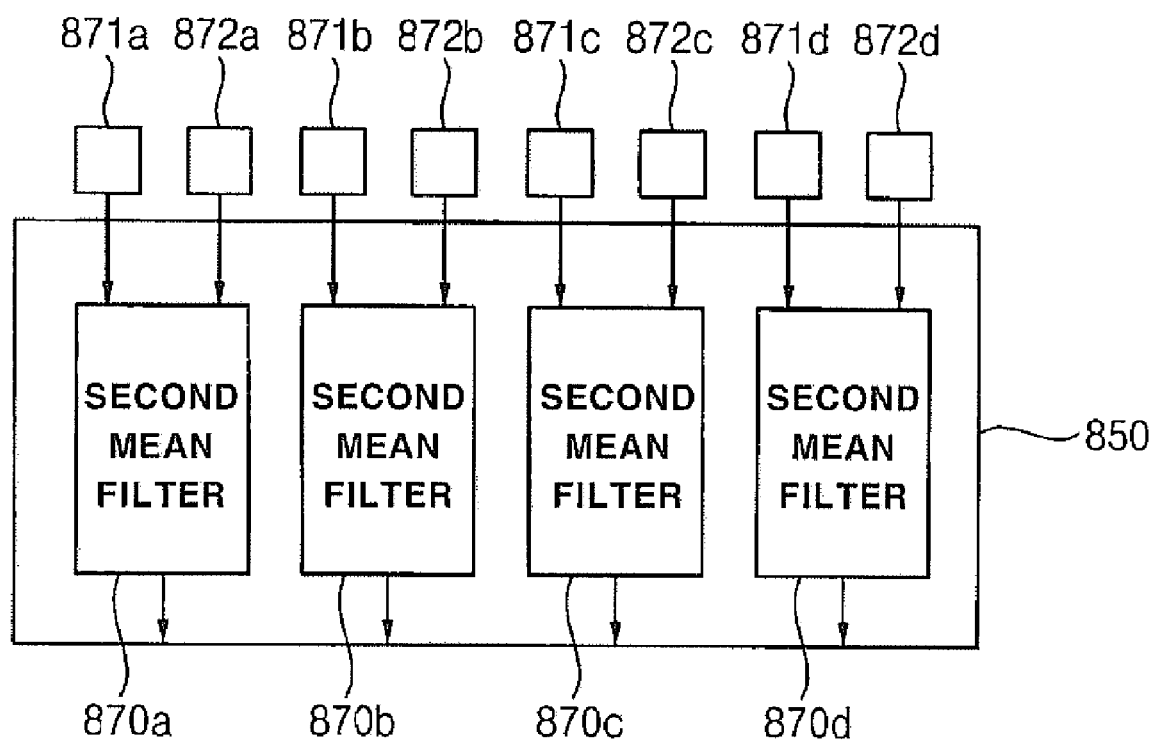
FIG. 11A is a diagram showing the fourth interpolator of the high-speed motion compensation apparatus of FIG. 5.

FIG. 11A is a diagram showing the fourth interpolator of the high-speed motion compensation apparatus of FIG. 5.

Referring to FIG. 11A, the fourth interpolator 850 includes four second mean filters 870a, 870b, 870c, and 870d for performing an operation of obtaining a mean value.

Each of the second mean filters 870a, 870b, 870c, and 870d receives a first half pixel 871a, 871b, 871c, or 871d, and a second half pixel 872a, 872b, 872c, or 872d. The fourth interpolator 850 receives the first half pixels and the second half pixels as inputs in luma components, obtains respective means values of the first half pixels and the second half pixels, and thus generates second quarter pixels, or, alternatively, receives the first half pixels, obtains respective mean values of the first half pixels, and thus generates second quarter pixels. The fourth interpolator 850 may include the fourth second mean filters 870a, 870b, 870c, and 870d, and may generate four second quarter pixels per clock cycle. For example, in order to generate the sub-pixel e, which is the second quarter pixel of FIGS. 3A, 3B, and 3C, the mean filter 870a receives sub-pixels b and h, which are the first half pixels of FIGS. 3A, 3B, and 3C, as inputs, and obtains the mean value of the received pixels using the rounding coefficient of 1, thus generating the sub-pixel e, which is the second quarter pixel. Further, in order to generate a sub-pixel i, which is the second quarter pixel of FIGS. 3A, 3B, and 3C, the mean filter 870a receives a sub-pixel b, which is the first half pixel of FIGS. 3A, 3B, and 3C, and a sub-pixel j, which is the second half pixel, as inputs, and obtains the mean value thereof using the rounding coefficient 1, thus generating the sub-pixel i, which is the second quarter pixel. That is, the determination of inputs in the fourth interpolator 850 is performed based on the locations of second quarter pixels to be generated.

Figure 11B:
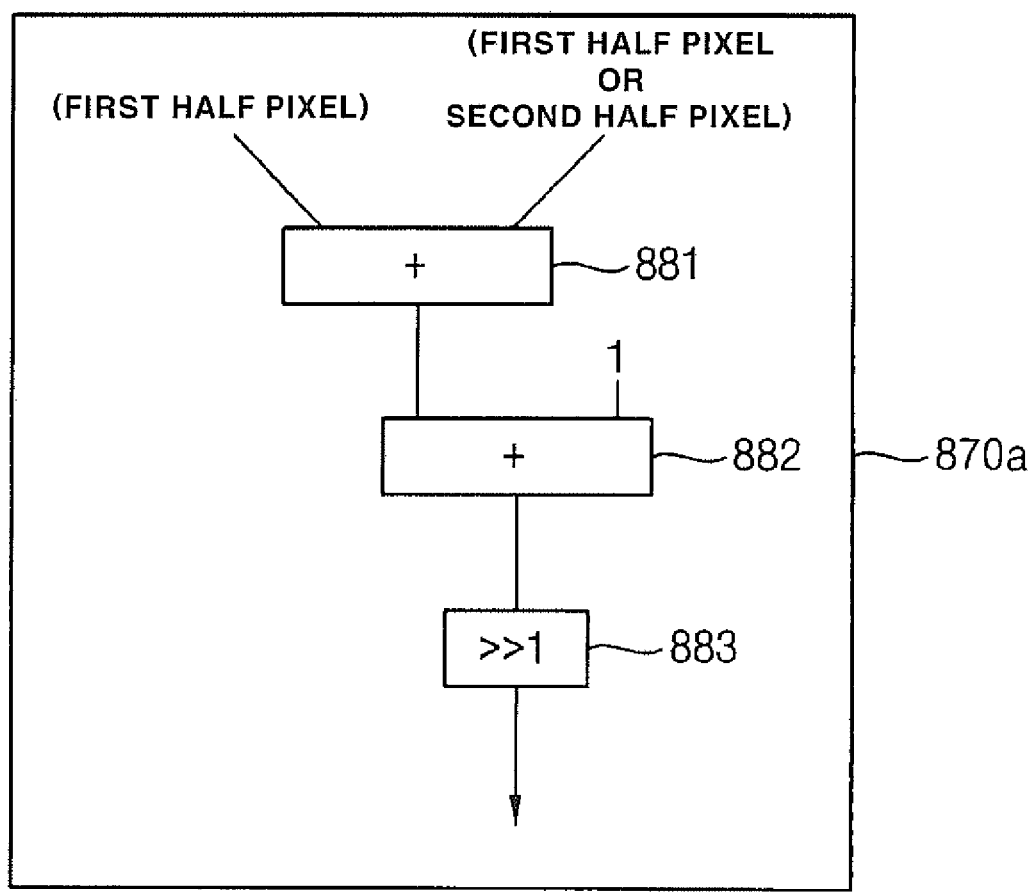
FIG. 11B is a diagram showing the structure of the second mean filters of the fourth interpolator of FIG. 11A.

FIG. 11B is a diagram showing the structure of the second mean filters of the fourth interpolator of FIG. 11A.

Referring to FIG. 11B, each of the second mean filters includes a sixteenth adder 881, a seventeenth adder 882, and a seventh shifter 883.

The sixteenth adder 881 performs an addition operation on a first half pixel and a second half pixel, or on first half pixels. The seventeenth adder 882 performs an addition operation on the operation result of the sixteenth adder 881 and a rounding coefficient of 1, and the seventh shifter 883 performs an operation of shifting the operation result of the seventeenth adder 882 1 bit to the right, thus generating second quarter pixels.

Figure 12A:
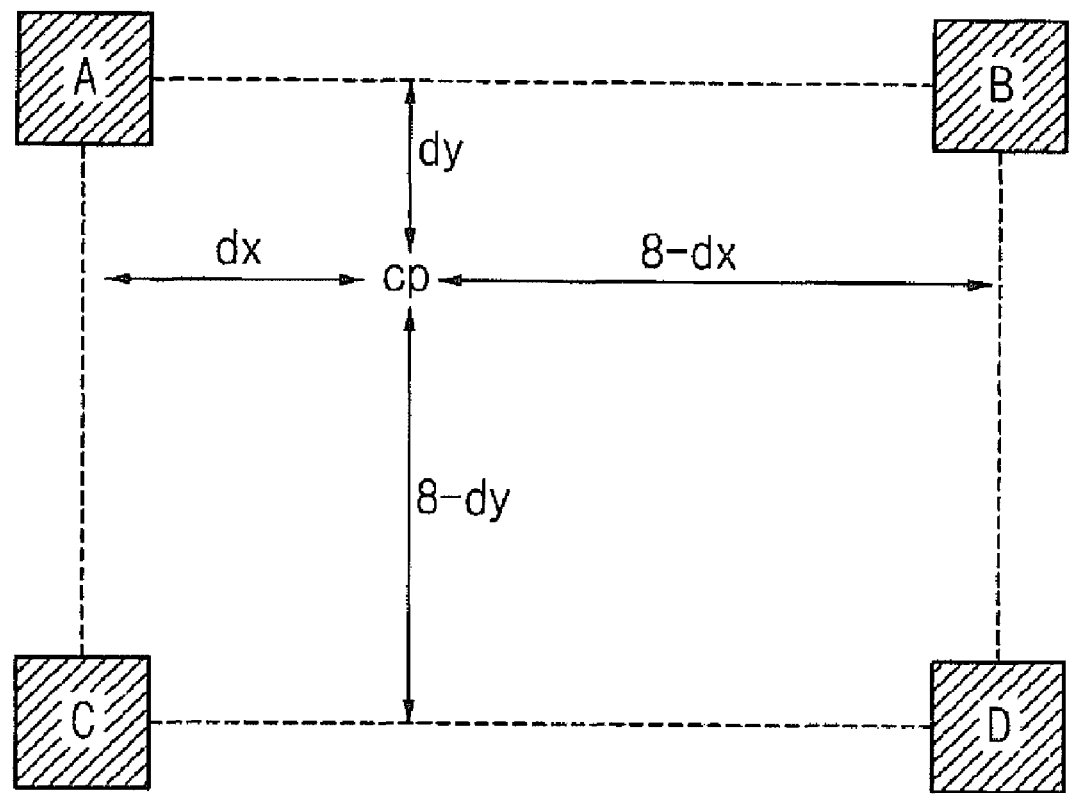
FIG. 12A is a diagram showing the bilinear filtering of the chrome filter unit of the high-speed motion compensation apparatus of FIG. 5.

FIG. 12A is a diagram showing the bilinear filtering of the chroma filter unit of the high-speed motion compensation apparatus of FIG. 5.

Referring to FIG. 12A, the chroma filter unit 600 uses bilinear filtering of assigning weights to surrounding reference pixels at the time of generating chroma pixels. Pixels A, B, C, and D denote integer pixels, and a pixel cp denotes a chroma pixel generated using bilinear filtering. Vectors dx and dy denote motion vectors that represent the resolutions of chroma pixels.

In this case, the chrome pixels are generated using the following Equation [3a], $$cp = ((8-dy) \times (8-dx) \times A + dx \times (8-dy) \times B + \\ (8-dx) \times dy \times C + dx \times dy \times D + 32) >> 5 \quad [3a]$$

where A and B denote 8-bit integer pixels, input to the chrome filter unit, C and D denote 8-bit integer pixels, input to the chroma filter unit in a cycle subsequent to the cycle in which A and B are input to the chrome filter unit, dx and dy denote lower 3 bits of respective motion vectors, and cp denotes an 8-bit chroma pixel.

As shown in Equation [3a], when chrome pixels are placed close to a specific integer pixel, they are greatly influenced by the value of the integer pixel. For example, when the values of the motion vectors dx and dy are small, and the chroma pixel cp is close to the integer pixel A, the values of motion vectors (8−dy) and (8−dx) are greater than that of the motion vector dx or dy, and thus the chroma pixel cp has a value similar to that of the integer pixel A.

Figure 12B:
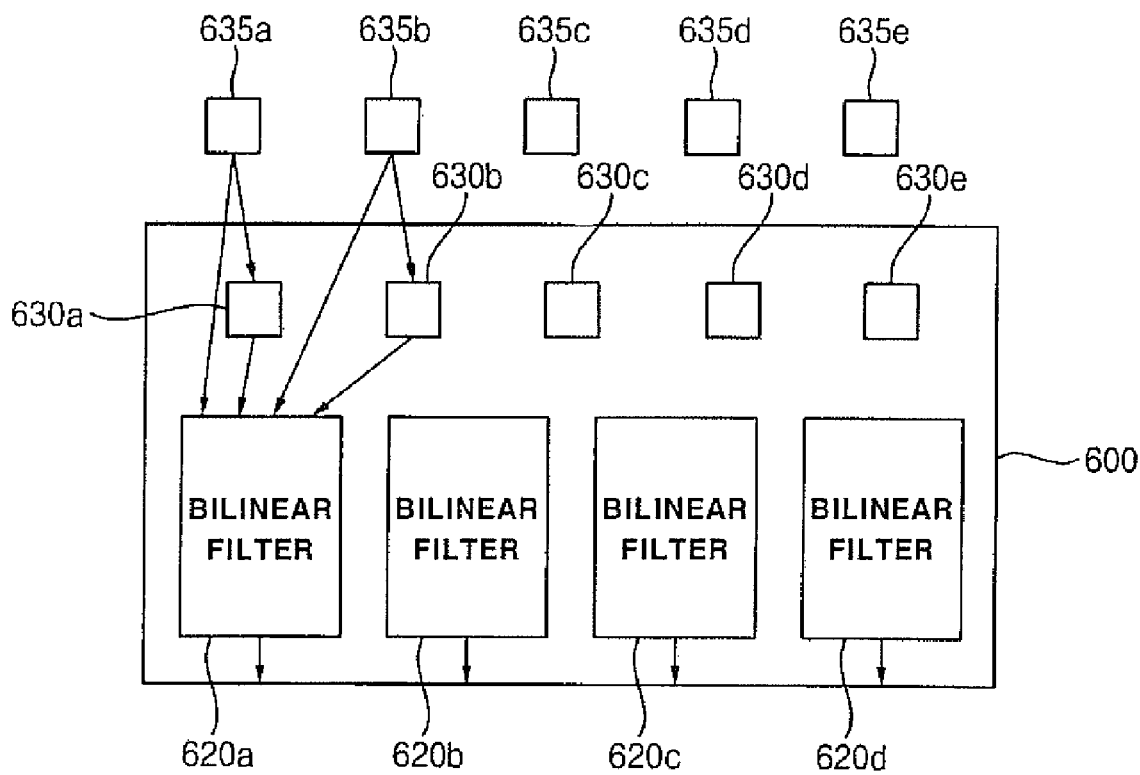
FIG. 12B is a diagram showing the chroma filter unit of the high-speed motion compensation apparatus of FIG. 5.

FIG. 12B is a diagram showing the chrome filter unit of the high-speed motion compensation apparatus of FIG. 5.

Referring to FIG. 12B, the chrome filter unit 600 includes four bilinear filters 620a, 620b, 620c, and 620d.

Each of the bilinear filters 620a, 620b, 620c, and 620d receives an integer pixel 635a, 635b, 635c, or 635d in a current cycle and an integer pixel 630a, 630b, 630c, or 630d in a cycle previous to the current cycle. In chroma components, the chroma pixels are generated by multiplying respective coefficients corresponding to motion vectors by four integer pixels and by adding the resulting values to each other When lower 3 bits in each motion vector, that is, a portion representing a decimal point, is the motion vector dx or dy, the chroma pixels are obtained using the following Equation [3b], which is a modification of Equation [3a], $$cp=((8-dx)\times(8\times A+dy\times(C-A)+dx\times(8\times B+dy\times(D-B))+ \\ 32)>>5 \quad [3b]$$

where A and B denote 8-bit integer pixels, input to the chrome filter unit, C and D denote 8-bit integer pixels, input to the chroma filter unit in a cycle subsequent to the cycle in which A and B are input to the chroma filter unit, dx and dy denote lower 3 bits of respective motion vectors, and cp denotes an 8-bit chroma pixel.

The chroma filter unit 600 performs bilinear filtering using two integer pixels in the current line and two integer pixels in the line previous to the current line, that is, a total of four integer pixels, in order to obtain a single chroma pixel. Therefore, when integer pixels are input on a line basis, integer pixels corresponding to previous lines must be temporarily stored in registers. That is, the integer pixels 630a, 630b, 630c, 630d, and 630e, which have been stored in advance, correspond to the integer pixels A and B of FIG. 12A, and are temporarily stored in a register. When the integer pixels 635a, 635b, 635c, 635d, and 635e, corresponding to the integer pixels C and D of FIG. 12A, are input after one clock cycle, the bilinear filters 620a, 620b, 620c, and 620d generate chrome pixels using four integer pixels, that is, the integer pixels A, B, C, and D of FIG. 12A.

Since the chrome filter unit 600 includes four bilinear filters 620a, 620b, 620c, and 620d, four chroma pixels can be generated within one clock cycle. Therefore, when five integer pixel lines are continuously filled in the chrome filter unit, chrome pixels can be continuously obtained with one clock cycle delayed. That is, a chrome pixel block composed of 4×4 chrome pixels can be generated within five clock cycles. The reason why one clock cycle delay occurs in the chrome filter unit 600 is that previous integer pixels 630a, 630b, 630c, 630d, and 630e are required.

Figure 12C:
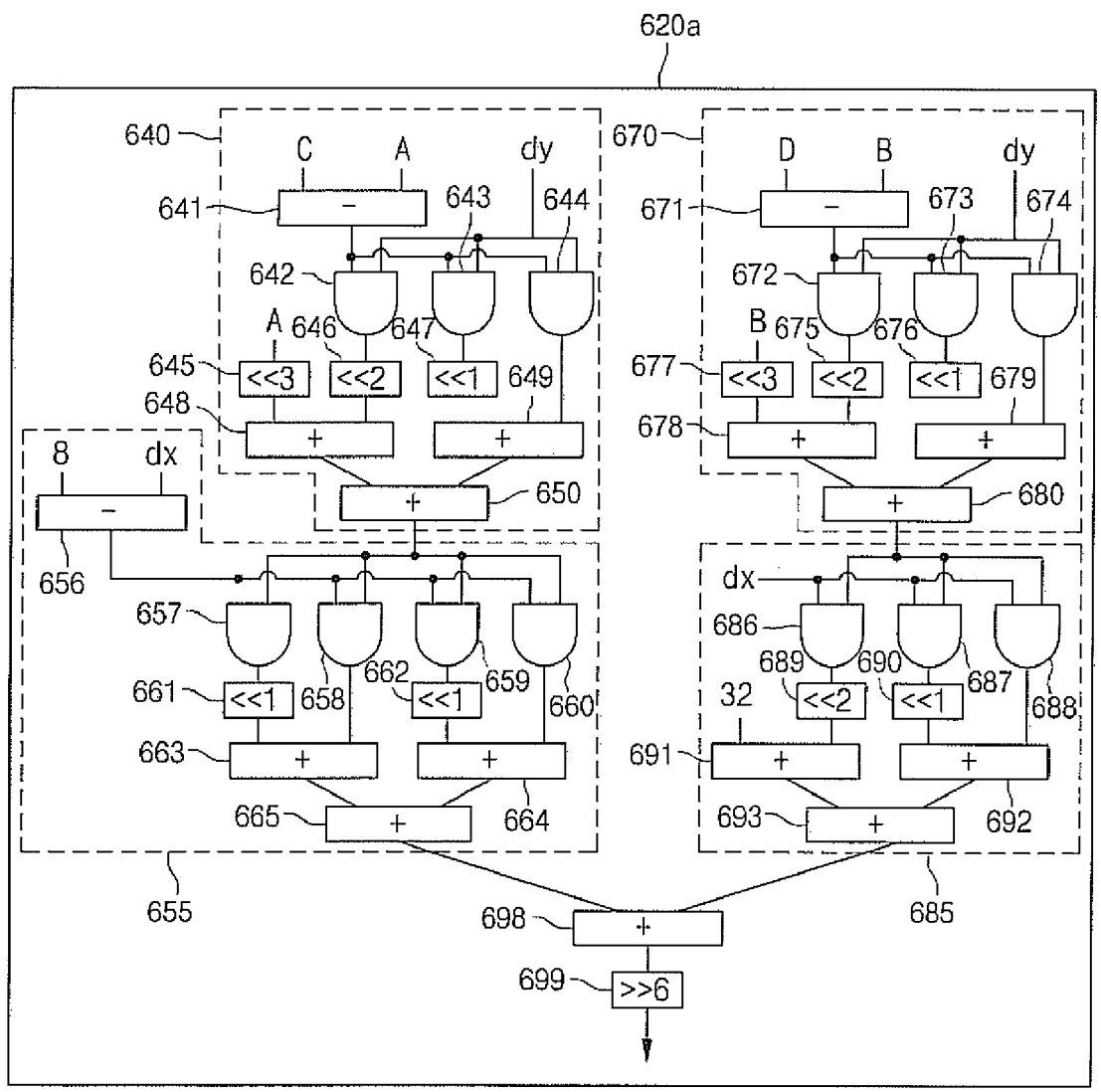
FIG. 12C is a diagram showing the bilinear filter of the chromatic filter unit of FIG. 12B.

FIG. 12C is a diagram showing the structure of the bilinear filters of the chroma filter unit of FIG. 12B.

Referring to FIG. 12C, each of the bilinear filters 620a, 620b, 620c, and 620d includes a first sub-unit 650, a second sub-unit 660, a third sub-unit 670, a fourth sub-unit 685, an eighteenth adder 698, and an eighth shifter 699.

Referring to Equation [3a], it can be seen that a large number of multiplication operations is used. In order to perform the multiplication operation of Equation [3a], each of the bilinear filters 620a, 620b, 620c, and 620d performs an addition operation using Equation [3b], which is a modification of Equation [3a].

The motion vector dy is a variable composed of 3 bits, and the term dx×(C−A) can be developed to the following Equation [4].

$$dy[2:0] \times ((C-A) = dy[2] \times (C-A) + dy[1] \times (C-A) + dy[0] \times (C-A) \quad [4]$$

In Equation [4], since a multiplication operation can be replaced with an AND operator (&), the operation result of the term dy×(C−A) can be obtained by performing an AND operation on the result value of (C−A) and each of dy[2], dy[1], and dy[0], and by adding the results of AND operations corresponding to respective bits to each other. Similarly, the operation result of the term dy×(D−B) can also be obtained using the same method.

The results of operations 8×A and 8×B can be obtained by shifting A or B 3 bits to the left. Therefore, all of the multiplication operations used in Equation [3b] can be represented by AND operations. Each of the bilinear filters 620a, 620b, 620c, and 620d can be implemented using AND gates and adders. Here, the operation represented by each AND gate denotes an operation performed on a single bit, such as dy[2], and a variable, such as (C−A), rather than an AND operation on two bits.

The first sub-unit 640 includes a third subtracter 641, a first AND gate 642, a second AND gate 643, a third AND gate 644, a ninth shifter 646, a tenth shifter 647, an eleventh shifter 645, a nineteenth adder 648, a twentieth adder 649, and a twenty first adder 650. The third subtracter 641 performs a subtraction operation on C and A, the first AND gate 642 performs an AND operation on the operation result of the third subtractor 641 and dy, and the second AND gate 643 performs an AND operation on the operation result of the third subtracter 641 and dy. The third AND gate 644 performs an AND operation on the operation result of the third subtracter 641, and dy, the ninth shifter 646 performs an operation of shifting the operation result of the first AND gate 642 2 bits to the left, and the tenth shifter 647 performs an operation of shifting the operation result of the second AND gate 643 1 bit to the left. The eleventh shifter 645 performs an operation of shifting A 3 bits to the left, the nineteenth adder 648 performs an addition operation on the operation result of the eleventh shifter 645 and the operation result of the ninth shifter 646, and the twentieth adder 649 performs an addition operation on the operation result of the tenth shifter 647 and the operation result of the third AND gate 644. The twenty first adder 650 performs an addition operation on the operation result of the nineteenth adder 648 and the operation result of the twentieth adder 649.

The second sub-unit 655 includes a fourth subtracter 656, a fourth AND gate 657, a fifth AND gate 658, a sixth AND gate 659, a seventh AND gate 660, a twelfth shifter 661, a thirteenth shifter 662, a twenty second adder 663, a twenty third adder 664, and a twenty fourth adder 665. The fourth subtractor 656 performs a subtraction operation on a rounding coefficient of 8 and dx, the fourth AND gate 657 performs an AND operation on the operation result of the fourth subtractor 656 and the operation result of the twenty first adder 650, and the fifth AND gate 658 performs an AND operation on the operation result of the fourth subtractor 656 and the operation result of the twenty first adder 650. The sixth AND gate 659 performs an AND operation on the operation result of the fourth subtractor 656 and the operation result of the twenty first adder 650, and the seventh AND gate 660 performs an AND operation on the operation result of the fourth subtractor 656 and the operation result of the twenty first adder 650. The twelfth shifter 661 performs an operation of shifting the operation result of the fourth AND gate 657 1 bit to the left. The thirteenth shifter 662 performs an operation of shifting the operation result of the sixth AND gate 659 1 bit to the left. The twenty second adder 663 performs an addition operation on the operation result of the twelfth shifter 661 and the operation result of the fifth AND gate 658, and the twenty third adder 664 performs an addition operation on the operation result of the thirteenth shifter 662 and the operation result of the seventh AND gate 660. The twenty fourth adder 665 performs an addition operation on the operation result of the twenty second adder 663 and the operation result of the twenty third adder 664.

The third sub-unit 670 includes a fifth subtracter 671, an eighth AND gate 672, a ninth AND gate 673, a tenth AND gate 674, a fourteenth shifter 675, a fifteenth shifter 676, a sixteenth shifter 677, a twenty fifth adder 678, a twenty sixth adder 679, and a twenty seventh adder 680. The fifth subtractor 671 performs a subtraction operation on D and B, the eighth AND gate 672 performs an AND operation on the operation result of the fifth subtractor 671 and dy, and the ninth AND gate 673 performs an AND operation on the operation result of the fifth subtractor 671 and dy. The tenth AND gate 674 performs an AND operation on the operation result of the fifth subtractor 671 and dy, the fourteenth shifter 675 performs an operation of shifting the operation result of the eighth AND gate 672 2 bits to the left, and the fifteenth shifter 676 performs an operation of shifting the operation result of the ninth AND gate 673 1 bit to the left. The sixteenth shifter 677 performs an operation of shifting B 3 bits to the left, and the twenty fifth adder 678 performs an addition operation on the operation result of the sixteenth shifter 677 and the operation result of the fourteenth shifter 675. The twenty sixth adder 679 performs an addition operation on the operation result of the fifteenth shifter 676 and the operation result of the tenth AND gate 674. The twenty seventh adder 680 performs an addition operation on the operation result of the twenty fifth adder 678 and the operation result of the twenty sixth adder 679.

The fourth sub-unit 685 includes an eleventh AND gate 686, a twelfth AND gate 687, a thirteenth AND gate 688, a seventeenth shifter 689, an eighteenth shifter 690, a twenty eighth adder 691, a twenty ninth adder 692, and a thirtieth adder 693. The eleventh AND gate 686 performs an AND operation on the operation result of the twenty seventh adder 680 and dx, the twelfth AND gate 687 performs an AND operation on the operation result of the twenty seventh adder 680 and dx, and the thirteenth AND gate 688 performs an AND operation on the operation result of the twenty seventh adder 680 and dx. The seventeenth shifter 689 performs an operation of shifting the operation result of the eleventh AND gate 686 2 bits to the left, the eighteenth shifter 690 performs an operation of shifting the operation result of the twelfth AND gate 687 1 bit to the left, and the twenty eighth adder 691 performs an addition operation on a rounding coefficient of 32 and the operation result of the seventeenth shifter 689. The twenty ninth adder 692 performs an addition operation on the operation result of the eighteenth shifter 690 and the operation result of the thirteenth AND gate 688, and the thirtieth adder 693 performs an addition operation on the operation result of the twenty eighth adder 691 and the operation result of the twenty ninth adder 692.

The eighteenth adder 698 performs an addition operation on the operation result of the second sub-unit 655 and the fourth sub-unit 685, and the eighth shifter 699 performs an operation of shifting the operation result of the eighteenth adder 698 6 bits to the right, thus generating chroma pixels.

FIG. 13 is a diagram showing the processing capability of the high-speed motion compensation apparatus of FIG. 5.

Referring to FIG. 13, it shows that the high-speed motion compensation apparatus 1000 of FIG. 5 accesses memory 110 to 190 times per MB. This is the result obtained by reducing the number of accesses to the memory by 65 to 80% compared to the prior art. The high-speed motion compensation apparatus 1000 of FIG. 5 can perform motion compensation within 150 cycles per MB on the average.

The high-speed motion compensation apparatus and method according to the present invention is advantageous in that overlapping reference pixels are efficiently managed, and reference pixels arranged in word addresses are efficiently aligned, so that the number of accesses to memory can be reduced, thus enabling motion compensation to be performed at high speed. The high-speed motion compensation apparatus and method according to the present invention can be applied to H.264/AVC image compression, image compression requiring motion compensation, etc.

Although the preferred embodiments of the present invention have been disclosed for illustrative purposes those skilled in the art will appreciate that various modifications, additions and substitutions are possible, without departing from the scope and spirit of the invention as disclosed in the accompanying claims.

What is claimed is:

1. A high-speed motion compensation apparatus for generating sub-pixels using reference pixels for motion compensation, comprising:

a bus interface unit for reading a plurality of word addresses from an external storage device, aligning the reference pixels arranged over the plurality of word addresses, temporarily storing the aligned reference pixels, and sequentially outputting the aligned and temporarily stored reference pixels;

a buffer unit for temporarily storing overlapping reference pixels, which are repeatedly used to generate the sub-pixels, among the reference pixels output from the bus interface unit;

an interpolation unit for generating first half pixels, second half pixels, first quarter pixels, and second quarter pixels, using the reference pixels output from the bus interface unit; and a chroma filter unit for generating chroma pixels using the reference pixels output from the bus interface unit, wherein the interpolation unit comprises:

a first interpolator for performing interpolation between integer pixels, which are the reference pixels, thus generating first half pixels;

a second interpolator for performing interpolation between the first half pixels, thus generating second half pixels;

a third interpolator for performing interpolation between the first half pixels and the integer pixels, thus generating first quarter pixels; and a fourth interpolator for performing interpolation between the first half pixels and the second half pixels, or between the first half pixels, thus generating second quarter pixels, wherein the first interpolator comprises four first FIR filters, and generates 8-bit first hal pixels using the following Equation [1b], which is a modification of the following Equation [1a], $$1hp=\min(255,\max(0,(p0-5p1+20p2+20p3-5p4+p5+16)>>5)) \quad [1a]$$

$$1hp=\min(255,\max(0,((p0+p5)+(4(p2+p3)-(p1+p4))+4(4(p2+p3)-(p1+p4))+16)>>5 \quad [1b]$$

where p0, p1, p2, p3, p4, and p5 denote 8-bit integer pixels, and 1hp denotes an 8-bit first half pixel.

2. The high-speed motion compensation apparatus according to claim 1, wherein the bus interface unit comprises a first buffer for storing first reference pixels used for current motion compensation.

3. The high-speed motion compensation apparatus according to claim 1, wherein the bus interface unit comprises a second buffer for storing second reference pixels to be used for subsequent motion compensation.

4. The high-speed motion compensation apparatus according to claim 1, wherein the buffer unit comprises a third buffer for storing overlapping reference pixels, among the reference pixels required to generate vertically or diagonally arranged sub-pixels.

5. The high-speed motion compensation apparatus according to claim 1, wherein the buffer unit comprises a fourth buffer for storing overlapping reference pixels, among the reference pixels required to generate horizontally or diagonally arranged sub-pixels.

6. The high-speed motion compensation apparatus according to claim 1, wherein each of the first FIR filters comprises:

a first adder for performing an addition operation on the integer pixels p0 and p5;

a second adder for performing an addition operation on the integer pixels p2 and p3;

a third adder for performing an addition operation on the integer pixels p1 and p4;

a first shifter for performing an operation of shifting an operation result of the second adder 2 bits to left;

a first subtractor for performing a subtraction operation on an operation result of the first shifter and an operation result of the third adder;
a fourth adder for performing an addition operation on an operation result of the first adder and an operation result of the first subtracter;
a second shifter for performing an operation of shifting an operation result of the first sub-tractor 2 bits to left;
a third shifter for performing an operation of shifting an operation result of the first subtracter 2 bits to left;
a fifth adder for performing an addition operation on an operation result of the third shifter and a rounding coefficient of 16;
a sixth adder for performing an addition operation on an operation result of the second shifter and an operation result of the fourth adder, and outputting an operation result thereof to a half buffer;
a seventh adder for performing an addition operation on an operation result of the fourth adder and an operation result of the fifth adder; and
a first clip unit for outputting an operation result of the seventh adder without change when the operation result falls within a range from 0 to 255, outputting 0 when the operation result is less than 0, and outputting 255 when the operation result is greater than 255.

7. The high-speed motion compensation apparatus according to claim 1, wherein the second interpolator comprises four second FIR filters, and generates 8-bit second half pixels using the following Equation [2b], which is a modification of the following Equation [2a], $$2hp = \min(255, \max(0, \quad [2a]$$
$$(1HP0 - 5HP1 + 20HP2 + 20HP3 - 5HP4 + HP5 + 512) \gg 10))$$

$$2hp = \quad [2b]$$
$$\min(255, \max(0, ((HP0 + HP5) + (4(HP2 + HP3) - (HP1 + HP4)) +$$
$$4(4(HP2 + HP3) - (HP1 + HP4)) + 512) \gg 10))$$

where HP0, HP1, HP2, HP3, HP4, and HP5 denote 15-bit first half pixels stored in the half buffer, and 2hp denotes an 8-bit second half pixel.

8. The high-speed motion compensation apparatus according to claim 7, wherein each of the second FIR filters comprises:
an eighth adder for performing an addition operation on the first half pixels HP0 and HP5;
a ninth adder for performing an addition operation on the first half pixels HP2 and HP3;
a tenth adder for performing an addition operation on the first half pixels HP1 and HP4;
a fourth shifter for performing an operation of shifting an operation result of the ninth adder 2 bits to left;
a second subtractor for performing a subtraction operation on an operation result of the fourth shifter and an operation result of the tenth adder;
an eleventh adder for performing an addition operation on an operation result of the eighth adder and an operation result of the second subtractor;
a fifth shifter for performing an operation of shifting an operation result of the second subtractor 2 bits to left;
a twelfth adder for performing an addition operation on an operation result of the fifth shifter and a rounding coefficient of 512;
a thirteenth adder for performing an addition operation on an operation result of the eleventh adder and an operation result of the twelfth adder;
a sixth shifter for performing an operation of shifting an operation result of the thirteenth adder 10 bits to right; and
a second clip unit for outputting an operation result of the sixth shifter without change when the operation result of the sixth shifter falls within a range from 0 to 255, outputting 0 when the operation result is less than 0, and outputting 255 when the operation result is greater than 255.

9. The high-speed motion compensation apparatus according to claim 6, wherein the third interpolator comprises four first mean filters, and generates 8-bit first quarter pixels using respective mean values of the 8-bit first half pixels, output from the first clip unit, and the integer pixels.

10. The high-speed motion compensation apparatus according to claim 9, wherein each of the first mean filters comprises:
a fourteenth adder for performing an addition operation on a first half pixel and a corresponding integer pixel;
a fifteenth adder for performing an addition operation on an operation result of the fourteenth adder and a rounding coefficient of 1; and
a seventh shifter for performing an operation of shifting an operation result of the fifteenth adder 1 bit to right.

11. The high-speed motion compensation apparatus according to claim 6 or 8, wherein the fourth interpolator comprises four second mean filters, and generates 8-bit second quarter pixels using respective mean values of the 8-bit first half pixels output from the first clip unit and the 8-bit second half pixels output from the second clip unit, or respective mean values of the 8-bit first half pixels, output from the first clip unit.

12. The high-speed motion compensation apparatus according to claim 11, wherein each of the second mean filters comprises:
a sixteenth adder for performing an addition operation on a first half pixel and a corresponding second half pixel, or on first half pixels;
a seventeenth adder for performing an addition operation on an operation result of the sixteenth adder and a rounding coefficient of 1; and
a seventh shifter for performing an operation of shifting an operation result of the seventeenth adder 1 bit to right.

13. The high-speed motion compensation apparatus according to claim 1, wherein the chroma filter unit comprises four bilinear filters, and generates 8-bit chroma pixels using the following Equation [3b], which is a modification of the following Equation [3a], $$cp = ((8 - dy) \times (8 - dx) \times A + \quad [3a]$$
$$dx \times (8 - dy) \times B + (8 - dx) \times dy \times C + dx \times D + 32) \gg 5$$

$$cp = ((8 - dx) \times \quad [3b]$$
$$(8 \times A + dy \times (C - A) + dx \times (8 \times B + dy \times (D - B)) + 32) \gg 5$$

where A and B denote 8-bit integer pixels, input to the chrome filter unit, C and D denote 8-bit integer pixels, input to the chroma filter unit in a cycle subsequent to a cycle in which A and B are input to the chrome filter unit, dx and dy denote lower 3 bits of respective motion vectors, and cp denotes an 8-bit chroma pixel.

14. The high-speed motion compensation apparatus according to claim 13, wherein each of the bilinear filters comprises:
a first sub-unit having logic elements for implementing a term (8×A+dy×(C−A)) in Equation [3b];
a second sub-unit having logic elements for implementing a term (8×A+dy×(C−A))×(8−dx) obtained by multiplying the term (8×A+dy×(C−A)) in Equation [3b] by a term (8−dx) in Equation a third sub-unit having logic elements for implementing a term (8×B+dy×(D−B)) in Equation [3b];
a fourth sub-unit having logic elements for implementing a term (8×B+dy×(D−B))×dx+32, obtained by multiplying the term (8×B−dy×(D−B)) in Equation [3] by dx in Equation [3b] and by adding a resulting value thereof to a rounding coefficient of 32;
an eighteenth adder for performing an addition operation on an operation result of the second sub-unit and an operation result of the fourth sub-unit; and
an eighth shifter for performing an operation of shifting an operation result of the eighteenth adder 6 bits to right.

15. The high-speed motion compensation apparatus according to claim 14, wherein the first sub-unit comprises:
a third subtracter for performing a subtraction operation on the integer pixels C and A;
a first AND gate for performing an AND operation on an operation result of the third subtractor and the motion vector dy;
a second AND gate for performing an AND operation on the operation result of the third subtractor and the motion vector dy;
a third AND gate for performing an AND operation on the operation result of the third subtractor and the motion vector dy;
a ninth shifter for performing an operation of shifting an operation result of the first AND gate 2 bits to left;
a tenth shifter for performing an operation of shifting an operation result of the second AND gate 1 bit to left;
an eleventh shifter for performing an operation of shifting the integer pixel A by 3 bits to left;
a nineteenth adder for performing an addition operation on an operation result of the eleventh shifter and an operation result of the ninth shifter;
a twentieth adder for performing an addition operation on an operation result of the tenth shifter and an operation result of the third AND gate; and
a twenty first adder for performing an addition operation on an operation result of the nineteenth adder and an operation result of the twentieth adder.

16. The high-speed motion compensation apparatus according to claim 15, wherein the second sub-unit comprises:
a fourth subtractor for performing a subtraction operation on a rounding coefficient of 8 and the motion vector dx;
a fourth AND gate for performing an AND operation on an operation result of the fourth subtractor and an operation result of the twenty first adder;
a fifth AND gate for performing an AND operation on the operation result of the fourth subtracter and the operation result of the twenty first adder;
a sixth AND gate for performing an AND operation on the operation result of the fourth subtracter and the operation result of the twenty first adder;
a seventh AND gate for performing an AND operation on the operation result of the fourth subtracter and the operation result of the twenty first adder;
a twelfth shifter for performing an operation of shifting an operation result of the fourth AND gate 1 bit to left;
a thirteenth shifter for performing an operation of shifting an operation result of the sixth AND gate 1 bit to left;
a twenty second adder for performing an addition operation on an operation result of the twelfth shifter and an operation result of the fifth AND gate;
a twenty third adder for performing an addition operation on an operation result of the thirteenth shifter and an operation result of the seventh AND gate; and
a twenty fourth adder for performing an addition operation on an operation result of the twenty second adder and an operation result of the twenty third adder.

17. The high-speed motion compensation apparatus according to claim 14, wherein the third sub-unit comprises:
a fifth subtracter for performing a subtraction operation on the integer pixels D and B;
an eighth AND gate for performing an AND operation on an operation result of the fifth subtractor and the motion vector dy;
a ninth AND gate for performing an AND operation on the operation result of the fifth subtractor and the motion vector dy;
a tenth AND gate for performing an AND operation on the operation result of the fifth subtractor and the motion vector dy;
a fourteenth shifter for performing an operation of shifting an operation result of the eighth AND gate 1 bit to left;
a fifteenth shifter for performing an operation of shifting an operation result of the ninth AND gate 1 bit to left;
a sixteenth shifter for performing an operation of shifting the integer pixel B 3 bits to left;
a twenty fifth adder for performing an addition operation on an operation result of the sixteenth shifter and an addition result of the fourteenth shifter;
a twenty sixth adder for performing an addition operation on an operation result of the fifteenth shifter and an operation result of the tenth AND gate; and
a twenty seventh adder for performing an addition operation on an operation result of the twenty fifth adder and an operation result of the twenty sixth adder.

18. The high-speed motion compensation apparatus according to claim 17, wherein the fourth sub-unit comprises:
an eleventh AND gate for performing an AND operation on an operation result of the twenty seventh adder and the motion vector dx;
a twelfth AND gate for performing an AND operation on the operation result of the twenty seventh adder and the motion vector dx;
a thirteenth AND gate for performing an AND operation on the operation result of the twenty seventh adder and the motion vector dx;
a seventeenth shifter for performing an operation of shifting an operation result of the eleventh AND gate 2 bits to left;
an eighteenth shifter for performing an operation of shifting an operation result of the twelfth AND gate 1 bit to left;
a twenty eighth adder for performing an addition operation on a rounding coefficient of 32 and an operation result of the seventeenth shifter;
a twenty ninth adder for performing an addition operation on an operation result of the eighteenth shifter and an operation result of the thirteenth AND gate; and
a thirtieth adder for performing an addition operation on an operation result of the twenty eighth adder and an operation result of the twenty ninth adder.

19. A high-speed motion compensation method of generating sub-pixels using reference pixels for motion compensation, comprising the steps of:
- reading a plurality of word addresses from an external storage device;
- aligning the reference pixels arranged over the plurality of word addresses, and temporarily storing the aligned reference pixels;
- sequentially outputting the aligned and temporarily stored reference pixels;
- temporarily storing overlapping reference pixels, repeatedly used to generate the sub-pixels, among the sequentially output reference pixels;
- performing interpolation between integer pixels, which are the sequentially output reference pixels, thus generating first half pixels;
- performing Interpolation between the first half pixels, thus generating second half pixels;
- performing interpolation between the first half pixels and the integer pixels, thus generating first quarter pixels;
- performing interpolation between the first half pixels and the second half pixels, or between the first half pixels, thus generating second quarter pixels; and
- generating chroma pixels using the sequentially output reference pixels, wherein the step of generating the chroma pixels comprises four bilinear filtering steps, and generates 8-bit chroma pixels using the following Equation [3b], which is a modification of the following Equation [3a], $$cp = ((8-dy) \times (8-dx) \times A + dx \times (8-dy) \times B + (8-dx) \times dy \times C + dx \times dy \times D + 32) >> 5 \quad [3a]$$

$$cp = ((8-dx) \times (8 \times A + dy \times (C-A)) + dx \times (8 \times B + dy \times (D-B)) + 32) >> 5 \quad [3b]$$

where A and B denote 8-bit integer pixels, input at the chroma pixel generation step, C and D denote 8-bit integer pixels, input at the chroma pixel generation step in a cycle subsequent to a cycle in which A and B are input at the chroma pixel generation step, dx and dy denote lower 3 bits of respective motion vectors, and cp denotes an 8-bit chroma pixel.

20. The high-speed motion compensation method according to claim 19, wherein the step of aligning and temporarily storing the reference pixels comprises:
- a first buffering step of storing first reference pixels, used for current motion compensation; and
- a second buffering step of storing second reference pixels to be used for subsequent motion compensation.

21. The high-speed motion compensation method according to claim 19, wherein the step of temporarily storing the overlapping reference pixels comprises:
- a third buffering step of storing overlapping reference pixels, among the reference pixels used to generate vertically or diagonally arranged sub-pixels; and
- a fourth buffering step of storing overlapping reference pixels, among the reference pixels used to generate horizontally or diagonally arranged sub-pixels.

22. The high-speed motion compensation method according to claim 19, wherein the step of generating the first half pixels comprises four first FIR filtering steps, and generates 8-bit first half pixels using the following Equation [1b], which is a modification of the following Equation [1a], $$1hp = \min(255, \max(0, (p0 - 5p1 + 20p2 + 20p3 - 5p4 + p5 + 16) >> 5)) \quad [1a]$$

$$1hp = \min(255, \max(0, ((p0 + p5) + (4(p2 + p3) - (p1 + p4)) + 4(4(p2 + p3) - (p1 + p4)) + 16) >> 5 \quad [1b]$$

where p0, p1, p2, p3, p4, and p5 denote 8-bit integer pixels, and 1hp denotes an 8-bit first half pixel.

23. The high-speed motion compensation method according to claim 22, wherein each of the first FIR filtering steps comprises:
- a first addition step of performing an addition operation on the integer pixels p0 and p5;
- a second addition step of performing an addition operation on the integer pixels p2 and p3;
- a third addition step of performing an addition operation on the integer pixels p1 and p4;
- a first shifting step of performing an operation of shifting an operation result of the second addition step 2 bits to left;
- a first subtraction step of performing a subtraction operation on an operation result of the first shifting step and an operation result of the third addition step;
- a fourth addition step of performing an addition operation on an operation result of the first addition step and an operation result of the first subtraction step;
- a second shifting step of performing an operation of shifting an operation result of the first subtraction step 2 bits to left;
- a third shifting step of performing an operation of shifting an operation result of the first subtraction step 2 bits to left;
- a fifth addition step of performing an addition operation on an operation result of the third shifting step and a rounding coefficient of 16;
- a sixth addition step of performing an addition operation on an operation result of the second shifting step and an operation result of the fourth addition step;
- a seventh addition step of performing an addition operation on an operation result of the fourth addition step and an operation result of the fifth addition step; and
- a first clipping step of outputting an operation result of the seventh addition step without change when the operation result falls within a range from 0 to 255, outputting 0 when the operation result is less than 0, and outputting 255 when the operation result is greater than 255.

24. The high-speed motion compensation method according to claim 19, wherein the step of generating the second half pixels comprises four second FIR filtering steps, and generates 8-bit second half pixels using the following Equation [2b] which is a modification of the following Equation [2a], $$2hp = \min(255, \max(0, (1HP0 - 5HP1 + 20HP2 + 20HP3 - 5HP4 + HP5 + 512) >> 10)) \quad [2a]$$

$$2hp = \min(255, \max(0, ((HP0 + HP5) + (4(HP2 + HP3) - (HP1 + HP4)) + 4(4(HP2 + HP3) - (HP1 + HP4)) + 512) >> 10)) \quad [2b]$$

where HP0, HP1, HP2, HP3, HP4, and HP5 denote 15-bit first half pixels stored in a half buffer, and 2hp denotes an 8-bit second half pixel.

25. The high-speed motion compensation method according to claim 24, wherein each of the second FIR filtering steps comprises:

an eighth addition step of performing an addition operation on the first half pixels HP0 and HP5;

a ninth addition step of performing an addition operation on the first half pixels HP2 and HP3;

a tenth addition step of performing an addition operation on the first half pixels HP1 and HP4;

a fourth shifting step of performing an operation of shifting an operation result of the ninth addition step 2 bits to left;

a second subtraction step of performing a subtraction operation on an operation result of the fourth shifting step and an operation result of the tenth addition step;

an eleventh addition step of performing an addition operation on an operation result of the eighth addition step and an operation result of the second subtraction step;

a fifth shifting step of performing an operation of shifting an operation result of the second subtraction step 2 bits to left;

a twelfth addition step of performing an addition operation on an operation result of the fifth shifting step and a rounding coefficient of 512;

a thirteenth addition step of performing an addition operation on an operation result of the eleventh addition step and an operation result of the twelfth addition step;

a sixth shifting step of performing an operation of shifting an operation result of the thirteenth addition step 10 bits to right; and a second clipping step of outputting an operation result of the sixth shifting step without change when the operation result falls within a range from 0 to 255, outputting 0 when the operation result is less than 0, and outputting 255 when the operation result is greater than 255.

26. The high-speed motion compensation method according to claim 23, wherein the step of generating the first quarter to pixels comprises four first mean filtering steps, and generates 8-bit first quarter pixels using respective mean values of the 8-bit first half pixels, output from the first clipping step, and the integer pixels.

27. The high-speed motion compensation method according to claim 26, wherein each of the first mean filtering steps comprises:

a fourteenth addition step of performing an addition operation on a first half pixel and a corresponding integer pixel;

a fifteenth addition step of performing an addition operation on an operation result of the fourteenth addition step and a rounding coefficient of 1; and a seventh shifting step of performing an operation of shifting an operation result of the fifteenth addition step 1 bit to right.

28. The high-speed motion compensation method according to claim 23 or 25, wherein the step of generating the second quarter pixels comprises four second mean filtering steps, and generates 8-bit second quarter pixels using respective mean values of the 8-bit first half pixels, output at the first clipping step, and the 8-bit second half pixels, output at the second clipping step, or respective mean values of the 8-bit first half pixels, output at the first clipping step.

29. The high-speed motion compensation method according to claim 28, wherein each of the second mean filtering steps comprises:

a sixteenth addition step of performing an addition operation on a first half pixel and a corresponding second half pixel, or on first half pixels;

a seventeenth addition step of performing an addition operation on an operation result of the sixteenth addition step and a rounding coefficient of 1; and a seventh shifting step of performing an operation of shifting an operation result of the seventeenth addition step 1 bit to right.

30. The high-speed motion compensation method according to claim 19, wherein each of the bilinear filtering steps comprises:

a first sub-step of implementing a term $(8 \times A + dy \times (C-A))$ in Equation [3b];

a second sub-step of implementing a term $(8 \times A + dy \times (C-A)) \times (8-dx)$, obtained by multiplying the term $(8 \times A + dy \times (C-A))$ in Equation [3b] by a term $(8-dx)$ in Equation [3b];

a third sub-step of implementing a term $(8 \times B + dy \times (D-B))$ in Equation [3b];

a fourth sub-step of implementing a term $(8 \times B + dy \times (D-B)) \times dx + 32$, obtained by multiplying the term $(8 \times B + dy \times (D-B))$ in Equation [3b] by dx in Equation [3b] and by adding a resulting value thereof to a rounding coefficient of 32;

an eighteenth addition step of performing an addition operation on an operation result of the second sub-step and an operation result of the fourth sub-step; and an eighth shifting step of performing an operation of shifting an operation result of the eighteenth addition step 6 bits to right.

31. The high-speed motion compensation method according to claim 30, wherein the first sub-step comprises:

a third subtraction step of performing a subtraction operation on the integer pixels C and A;

a first AND operation step of performing an AND operation on an operation result of the third subtraction step and the motion vector dy;

a second AND operation step of performing an AND operation on the operation result of the third subtraction step and the motion vector dy;

a third AND operation step of performing an AND operation on the operation result of the third subtraction step and the motion vector dy;

a ninth shifting step of performing an operation of shifting an operation result of the first AND operation step 2 bits to left;

a tenth shifting step of performing an operation of shifting an operation result of the second AND operation step 1 bit to left;

an eleventh shifting step of performing an operation of shifting the integer pixel A 3 bits to left;

a nineteenth addition step of performing an addition operation on an operation result of the eleventh shifting step and an operation result of the ninth shifting step;

a twentieth addition step of performing an addition operation on an operation result of the tenth shifting step and an operation result of the third AND operation step; and a twenty first addition step of performing an addition operation on an operation result of the nineteenth addition step and an operation result of the twentieth addition step.

32. The high-speed motion compensation method according to claim 31, wherein the second sub-step comprises:

a fourth subtraction step of performing a subtraction operation on a rounding coefficient of 8 and the motion vector dx;

a fourth AND operation step of performing an AND operation on an operation result of the fourth subtraction step and an operation result of the twenty first addition step;

a fifth AND operation step of performing an AND operation on the operation result of the fourth subtraction step and the operation result of the twenty first addition step;

a sixth AND operation step of performing an AND operation on the operation result of the fourth subtraction step and the operation result of the twenty first addition step;

a seventh AND operation step of performing an AND operation on the operation result of the fourth subtraction step and the operation result of the twenty first addition step;

a twelfth shifting step of performing an operation of shifting an operation result of the fourth AND operation step 1 bit to left;

a thirteenth shifting step of performing an operation of shifting an operation result of the sixth AND operation step 1 bit to left;

a twenty second addition step for performing an addition operation on an operation result of the twelfth shifting step and an operation result of the fifth AND operation step;

a twenty third addition step of performing an addition operation on an operation result of the thirteenth shifting step and an operation result of the seventh AND operation step; and a twenty fourth addition step of performing an addition operation on an operation result of the twenty second addition step and an operation result of the twenty third addition step.

33. The high-speed motion compensation method according to claim 30, wherein the third sub-step comprises:

a fifth subtraction step of performing a subtraction operation on the integer pixels D and B;

an eighth AND operation step of performing an AND operation on an operation result of the fifth subtraction step and the motion vector dy;

a ninth AND operation step of performing an AND operation on the operation result of the fifth subtraction step and the motion vector dy;

a tenth AND operation step of performing an AND operation on the operation result of the fifth subtraction step and the motion vector dy;

a fourteenth shifting step of performing an operation of shifting an operation result of the eighth AND operation step 1 bit to left;

a fifteenth shifting step of performing an operation of shifting an operation result of the ninth AND operation step 1 bit to left;

a sixteenth shifting step of performing an operation of shifting the integer pixel B 3 bits to left;

a twenty fifth addition step of performing an addition operation on an operation result of the sixteenth shifting step and an addition result of the fourteenth shifting step;

a twenty sixth addition step of performing an addition operation on an operation result of the fifteenth shifting step and an operation result of the tenth AND operation step; and a twenty seventh addition step of performing an addition operation on an operation result of the twenty fifth addition step and an operation result of the twenty sixth addition step.

34. The high-speed motion compensation method according to claim 33, wherein the fourth sub-step comprises:

an eleventh AND operation step of performing an AND operation on an operation result of the twenty seventh addition step and the motion vector dx;

a twelfth AND operation step of performing an AND operation on the operation result of the twenty seventh addition step and the motion vector dx;

a thirteenth AND operation step of performing an AND operation on the operation result of the twenty seventh addition step and the motion vector dx;

a seventeenth shifting step of performing an operation of shifting an operation result of the eleventh AND operation step 2 bits to left;

an eighteenth shifting step of performing an operation of shifting an operation result of the twelfth AND operation step 1 bit to left;

a twenty eighth addition step of performing an addition operation on a rounding coefficient of 32 and an operation result of the seventeenth shifting step;

a twenty ninth addition step of performing an addition operation on an operation result of the eighteenth shifting step and an operation result of the thirteenth AND operation step; and a thirtieth addition step of performing an addition operation on an operation result of the twenty eighth addition step and an operation result of the twenty ninth addition step.

\* \* \* \* \*